US012791839B2

(12) United States Patent
Komiyama

(10) Patent No.: US 12,791,839 B2
(45) Date of Patent: Nov. 10, 2026

(54) OPTICAL SYSTEM AND APPARATUS INCLUDING OPTICAL SYSTEM

(71) Applicant: CANON KABUSHIKI KAISHA, Tokyo (JP)

(72) Inventor: Takahiro Komiyama, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 207 days.

(21) Appl. No.: 18/680,915

(22) Filed: May 31, 2024

(65) Prior Publication Data

US 2024/0402472 A1 Dec. 5, 2024

(30) Foreign Application Priority Data

May 31, 2023 (JP) ................................ 2023-090270

(51) Int. Cl.
*G02B 13/00* (2006.01)
*G02B 3/12* (2006.01)
*G02B 9/60* (2006.01)
*G02B 9/62* (2006.01)

(52) U.S. Cl.
CPC .......... *G02B 13/0075* (2013.01); *G02B 3/12* (2013.01); *G02B 9/60* (2013.01); *G02B 9/62* (2013.01); *G02B 13/0045* (2013.01); *G02B 13/006* (2013.01)

(58) Field of Classification Search
CPC ........ G02B 13/0075; G02B 3/12; G02B 9/60; G02B 9/62; G02B 13/0045; G02B 13/006; G02B 13/0015; G02B 13/18
USPC ......... 359/708, 713, 714, 756–760, 764–769
See application file for complete search history.

(56) References Cited

U.S. PATENT DOCUMENTS

2019/0154956 A1* 5/2019 Wang ................ G02B 13/0025
2019/0154957 A1* 5/2019 Wang ....................... G02B 9/60
2019/0154988 A1* 5/2019 Wang ................ G02B 27/0025

FOREIGN PATENT DOCUMENTS

JP S62125312 A 6/1987

OTHER PUBLICATIONS

Gross et al. "Handbook of Optical Systems vol. 3: Aberration Theory and Correction of Optical Systems" Weinheim Germany, Wiley-VCH Verlag GmbH & Co. KGaA, pp. 377-379 (Year: 2007).*

* cited by examiner

*Primary Examiner* — Marin Pichler
(74) *Attorney, Agent, or Firm* — Canon U.S.A., Inc. IP Division

(57) ABSTRACT

An optical system includes six or less lenses, wherein the six or less lenses include a plurality of positive lenses, and a final lens having negative refractive power and disposed closest to an image, and wherein, where a total optical length obtained by addition of a back focus to a distance from a lens surface closest to an object in the optical system to a final lens surface is TL, a half angle of view is ω[°], a focal length of a whole system is f, and an average value of a refractive index of a lens having a highest refractive index and a refractive index of a lens having a second highest refractive index among the plurality of positive lenses is np12ave, following conditions are satisfied: 0.50<TL/(f×tan ω)<1.90, and 1.80<np12ave<2.20.

22 Claims, 15 Drawing Sheets

OPTICAL SYSTEM AND APPARATUS INCLUDING OPTICAL SYSTEM

BACKGROUND

Technical Field

The aspect of embodiments relates to an optical system and is applied to a digital video camera, a digital still camera, a broadcasting camera, a silver-halide film camera, a monitoring camera, and the like.

Description of the Related Art

In an optical system used in an imaging apparatus using a solid-state image pickup element, such as a digital still camera and a video camera, there has been a demand for a lens that is small, but yet has satisfactory optical performance from the center of a screen to a perimeter of the screen.

Japanese Patent Application Laid-Open No. S62-125312 discusses an optical system in which a plurality of positive lenses having strong refractive power is arranged to downsize the optical system.

However, in a case where refractive power of each positive lens is increased to further downsize the optical system in Japanese Patent Application Laid-Open No. S62-125312, it is difficult to satisfactorily correct a field curvature. As a result, there is a possibility that sufficient optical performance cannot be obtained in the perimeter of the screen.

SUMMARY

According to an aspect of the embodiments, an optical system includes six or less lenses, wherein the six or less lenses include a plurality of positive lenses, and a final lens having negative refractive power and disposed closest to an image, and wherein, where a total optical length obtained by addition of a back focus to a distance from a lens surface closest to an object in the optical system to a final lens surface is TL, a half angle of view is ω[°], a focal length of a whole system is f, and an average value of a refractive index of a lens having a highest refractive index and a refractive index of a lens having a second highest refractive index among the plurality of positive lenses is np12ave, following conditions are satisfied: $0.50<TL/(f\times\tan\omega)<1.90$, and $1.80<np12ave<2.20$.

Further features of the disclosure will become apparent from the following description of exemplary embodiments with reference to the attached drawings.

DESCRIPTION OF THE EMBODIMENTS

Figure 1:
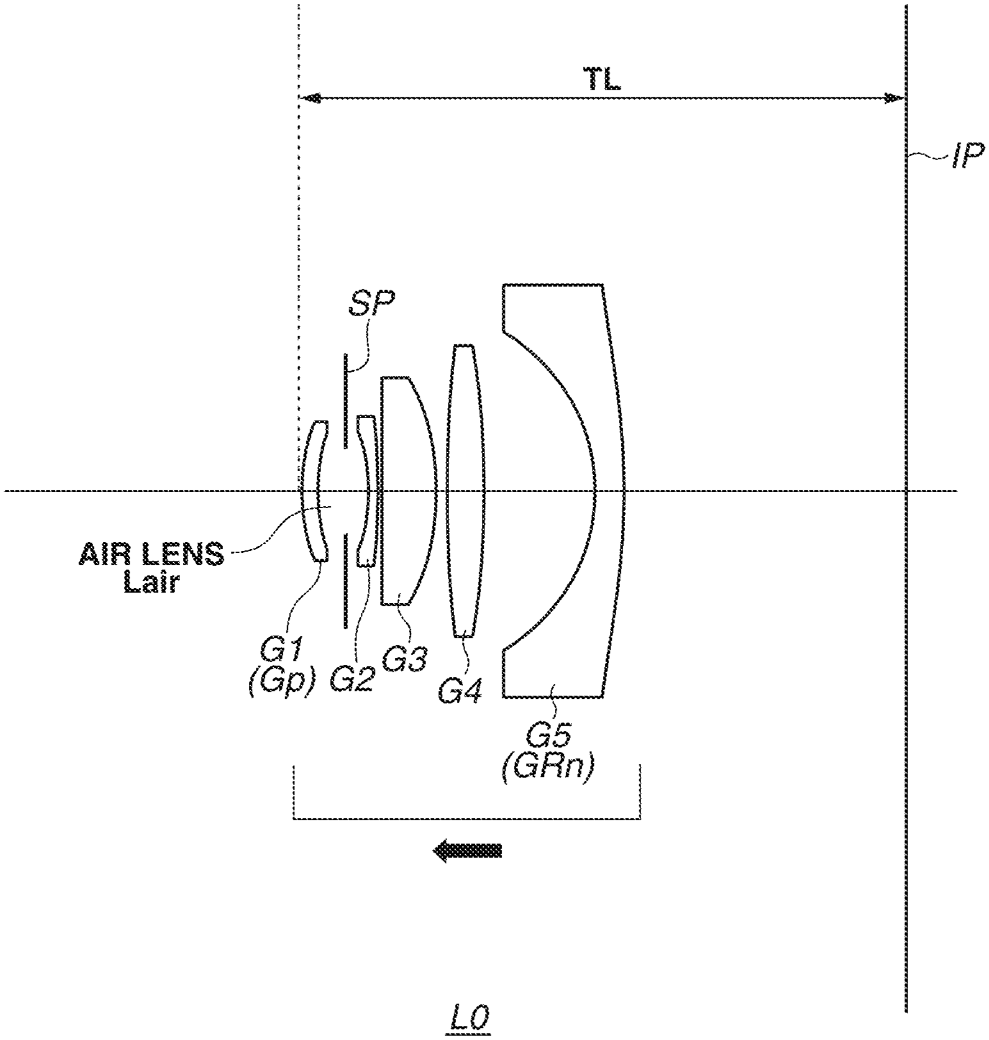
FIG. 1 is a cross-sectional view of an optical system according to a first exemplary embodiment when focusing on an object at infinity.
Figure 2:
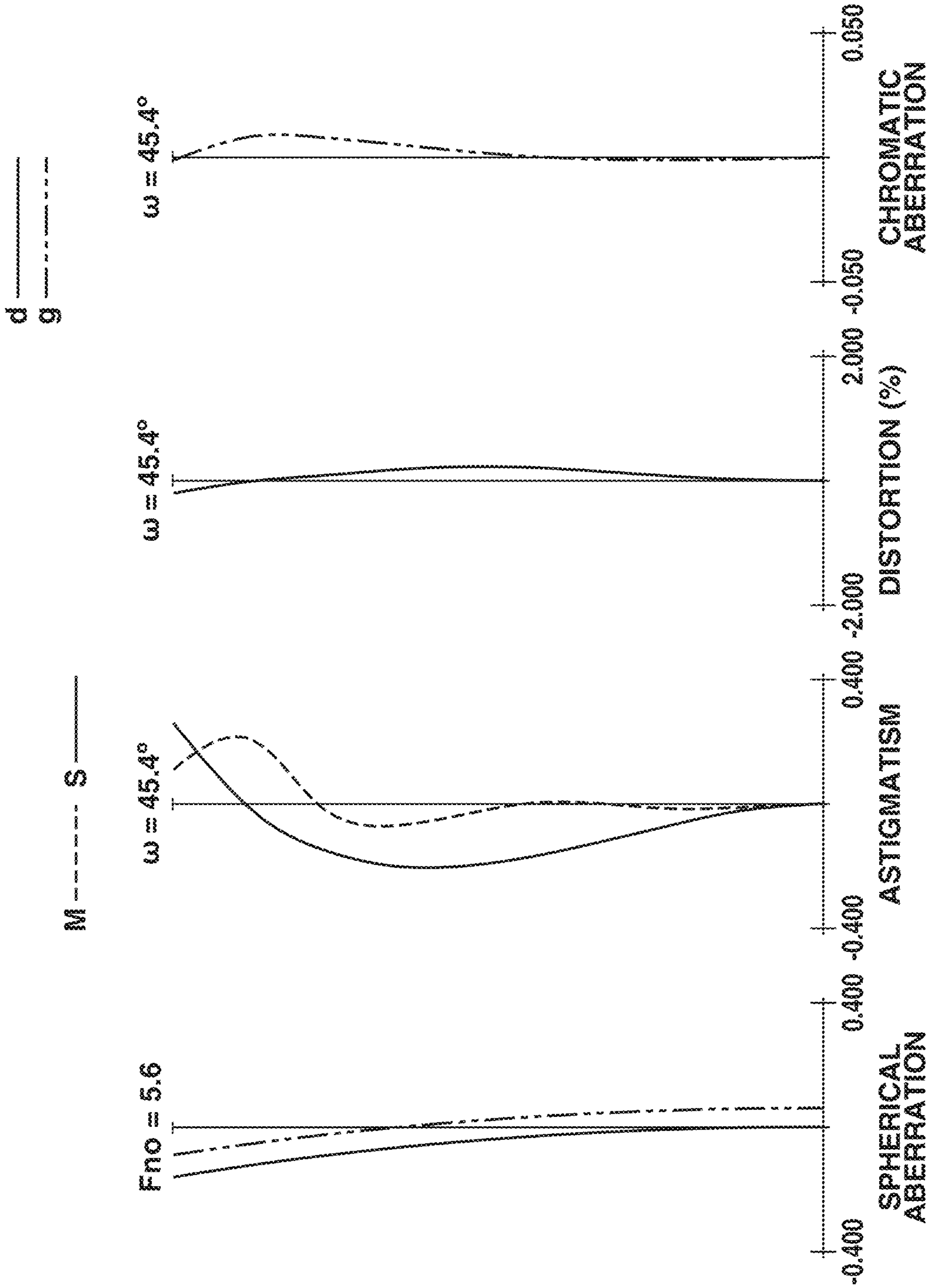
FIG. 2 is a longitudinal aberration diagram of the optical system according to the first exemplary embodiment.
Figure 3:
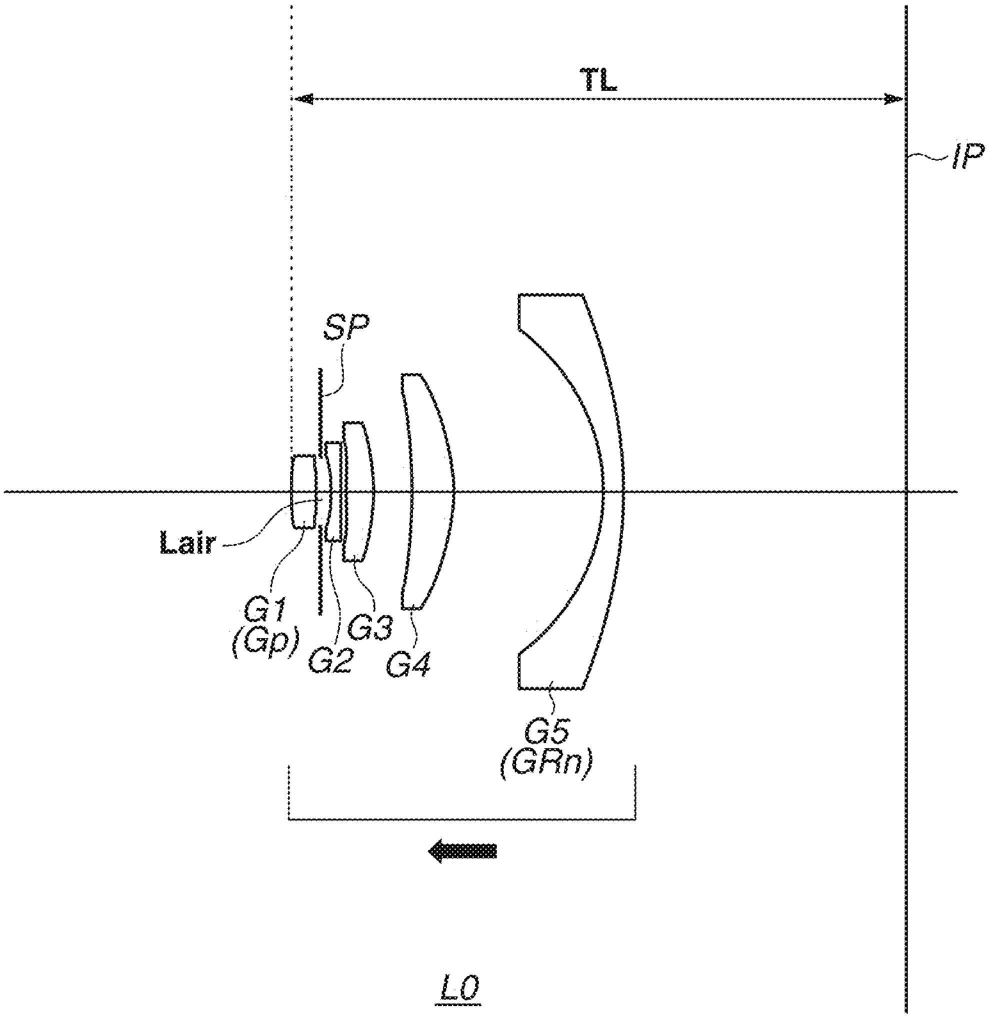
FIG. 3 is a cross-sectional view of an optical system according to a second exemplary embodiment when focusing on an object at infinity.
Figure 4:
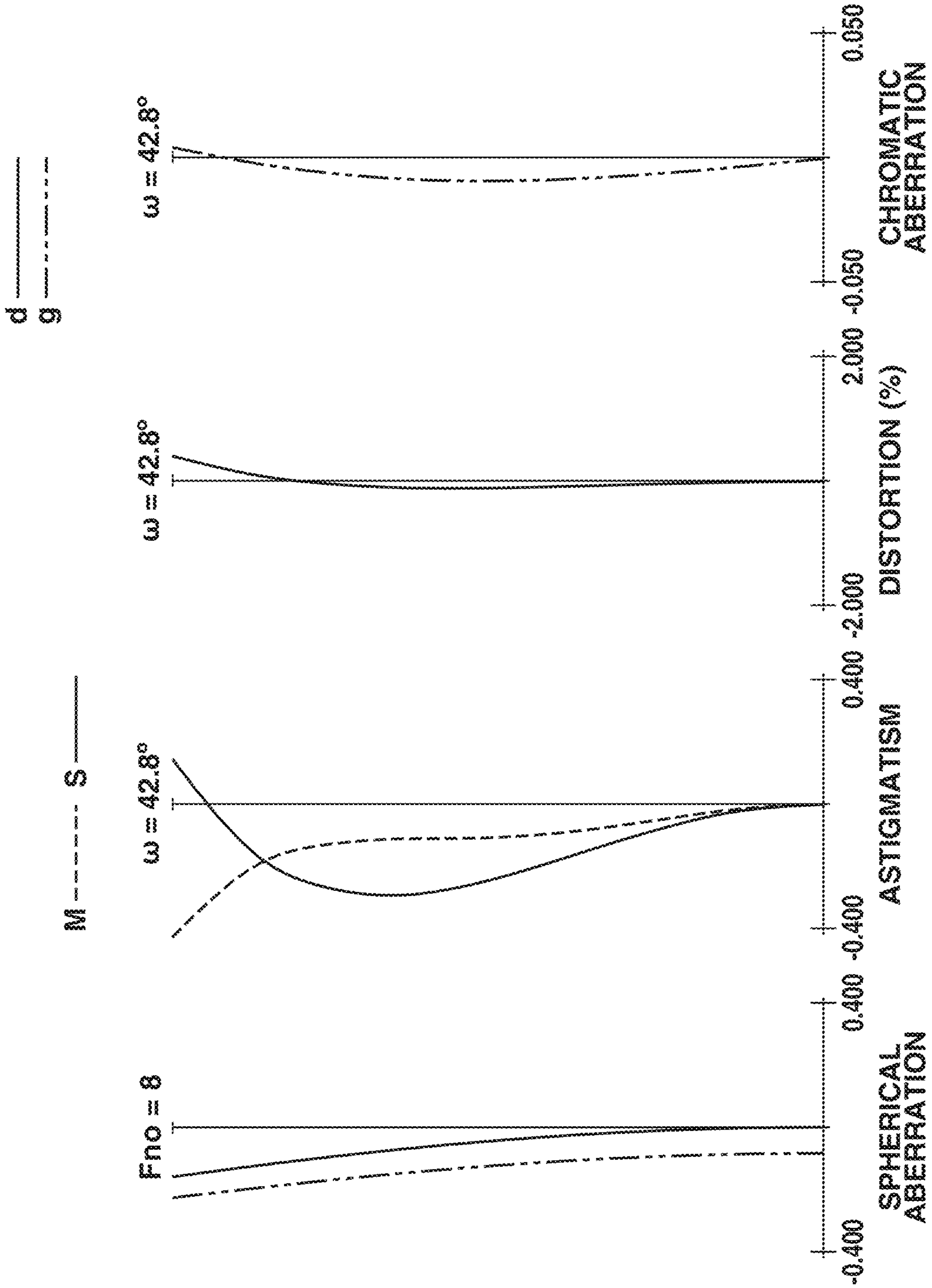
FIG. 4 is a longitudinal aberration diagram of the optical system according to the second exemplary embodiment.
Figure 5:
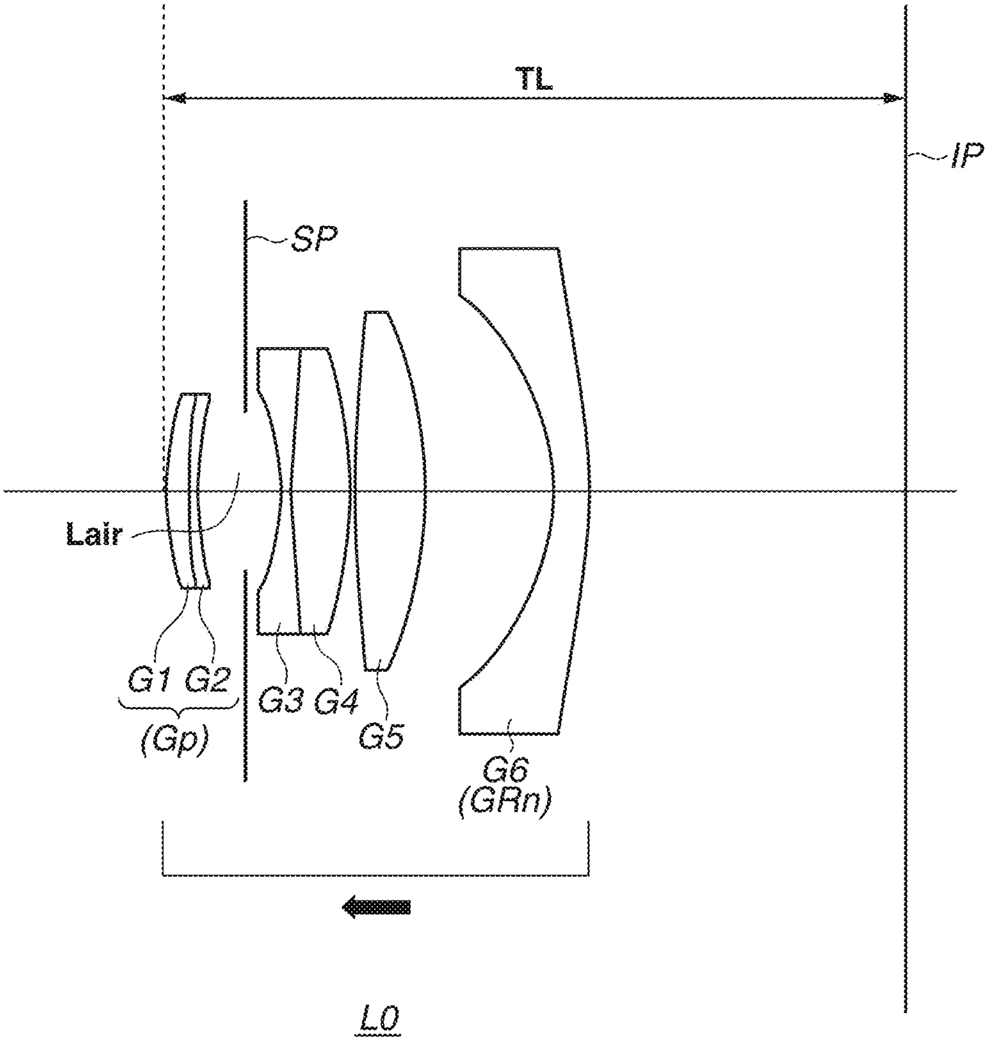
FIG. 5 is a cross-sectional view of an optical system according to a third exemplary embodiment when focusing on an object at infinity.
Figure 6:
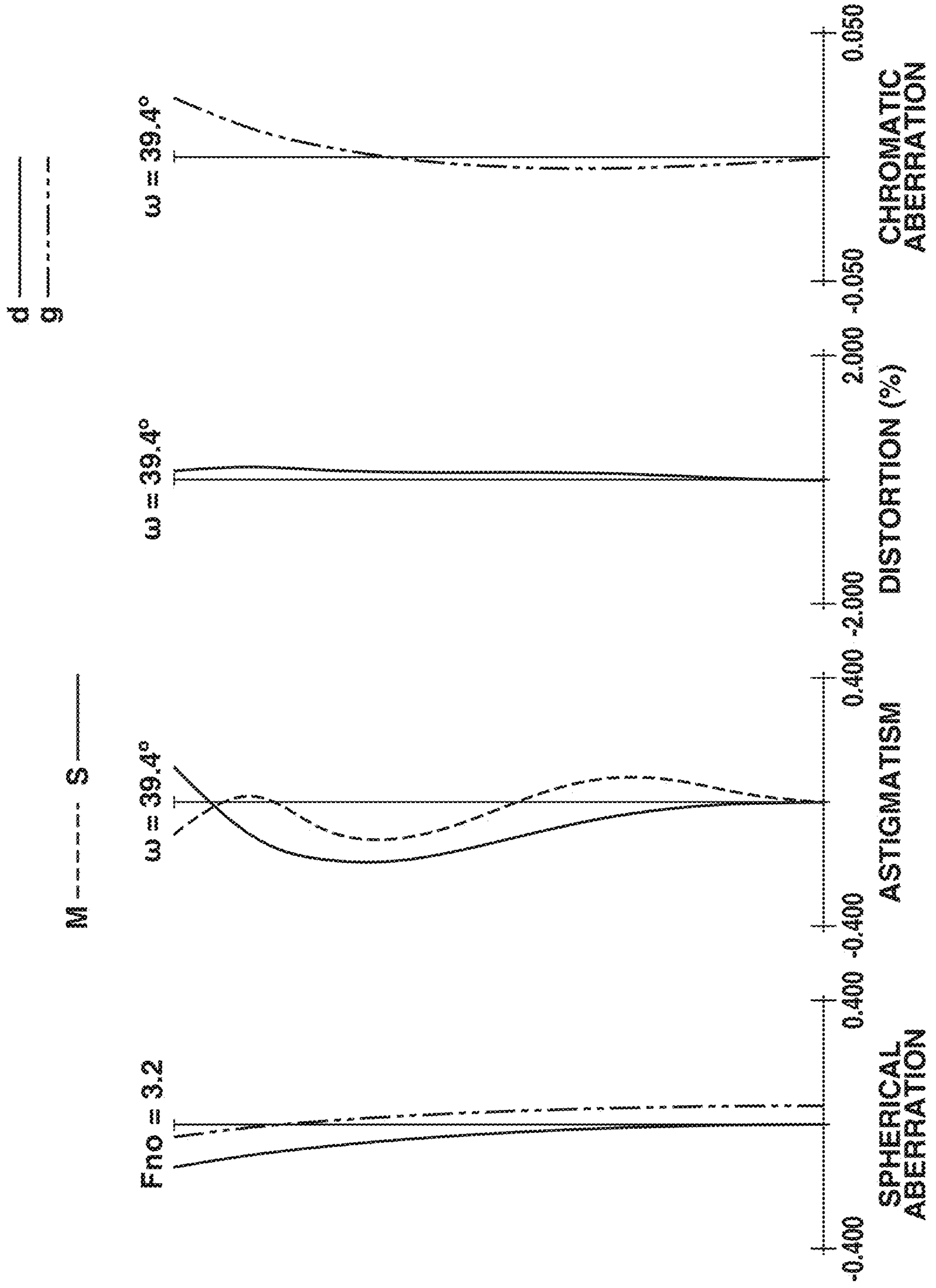
FIG. 6 is a longitudinal aberration diagram of the optical system according to the third exemplary embodiment.
Figure 7:
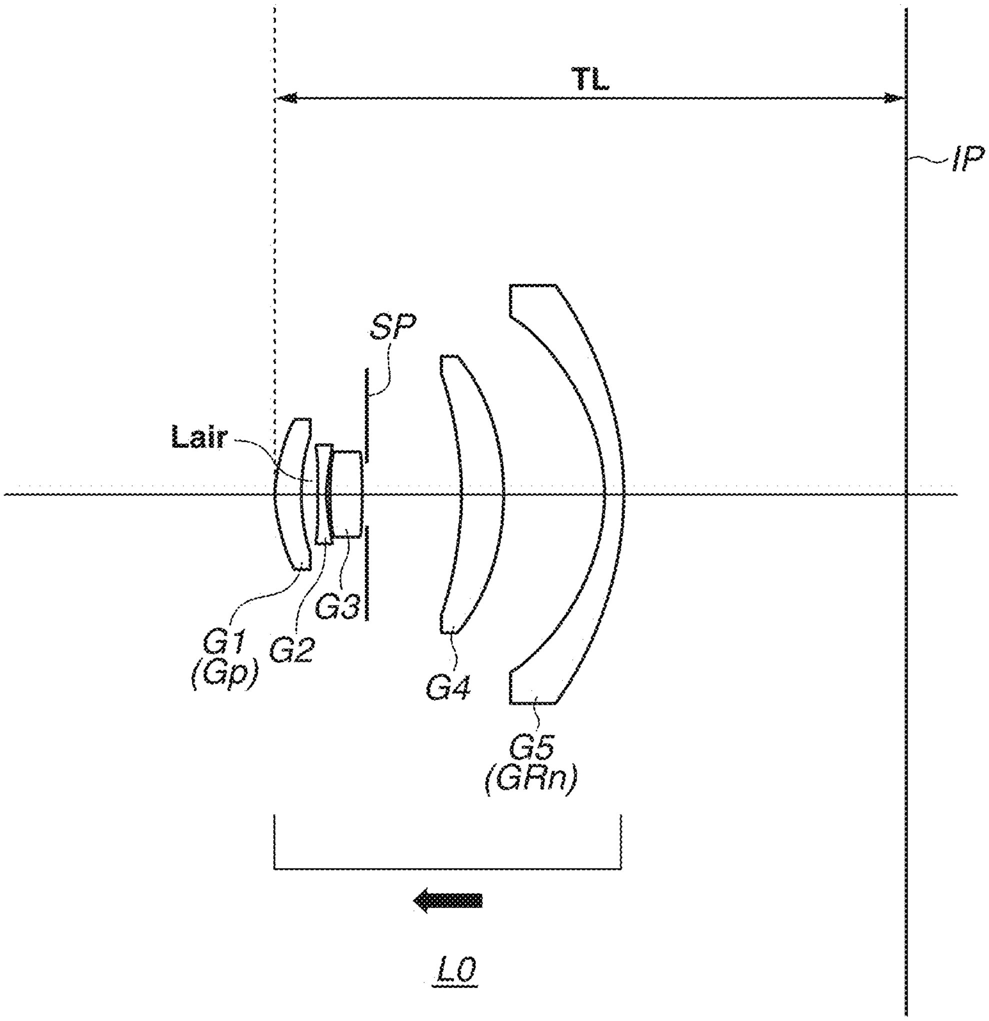
FIG. 7 is a cross-sectional view of an optical system according to a fourth exemplary embodiment when focusing on an object at infinity.
Figure 8:
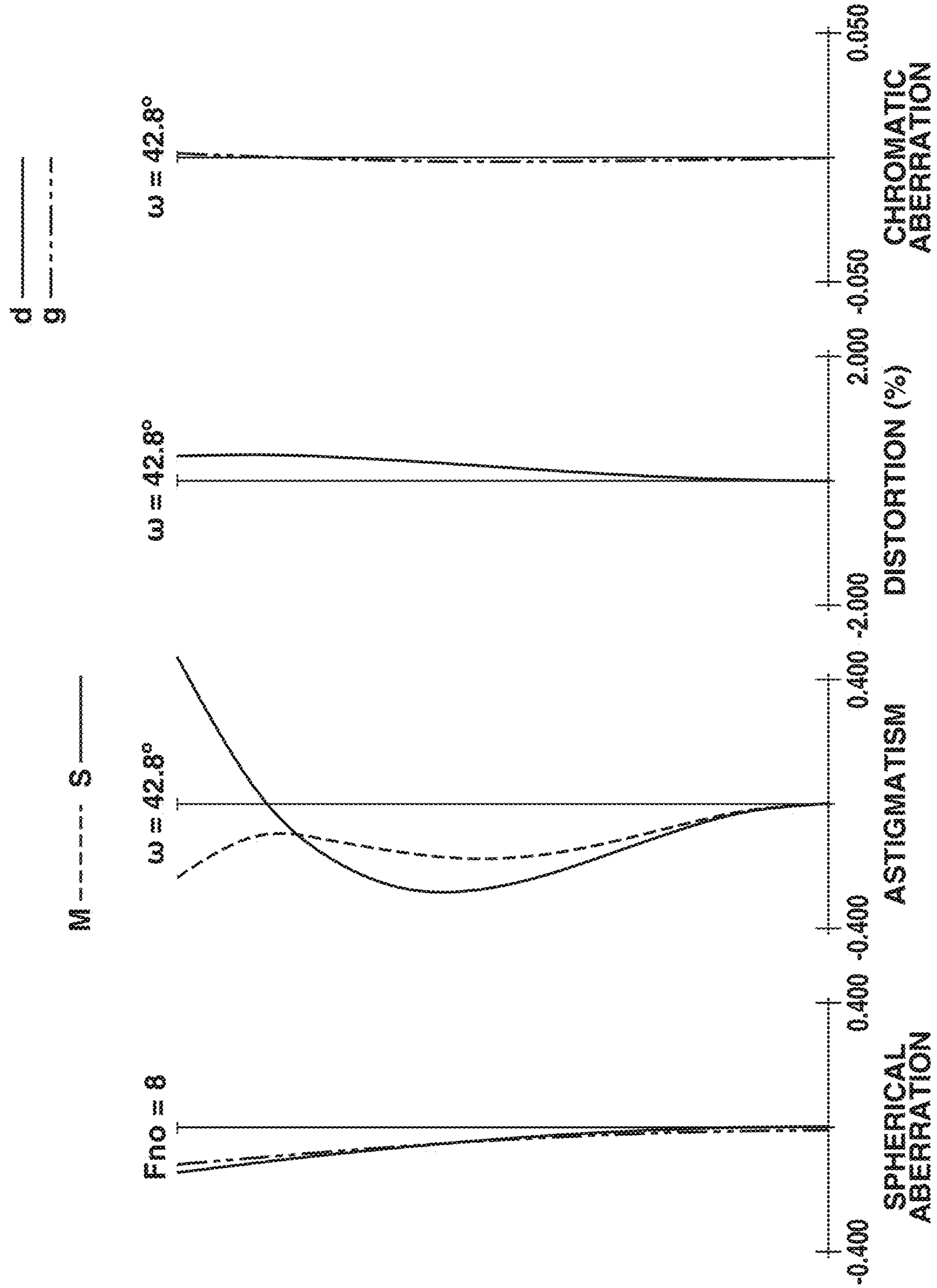
FIG. 8 is a longitudinal aberration diagram of the optical system according to the fourth exemplary embodiment.
Figure 9:
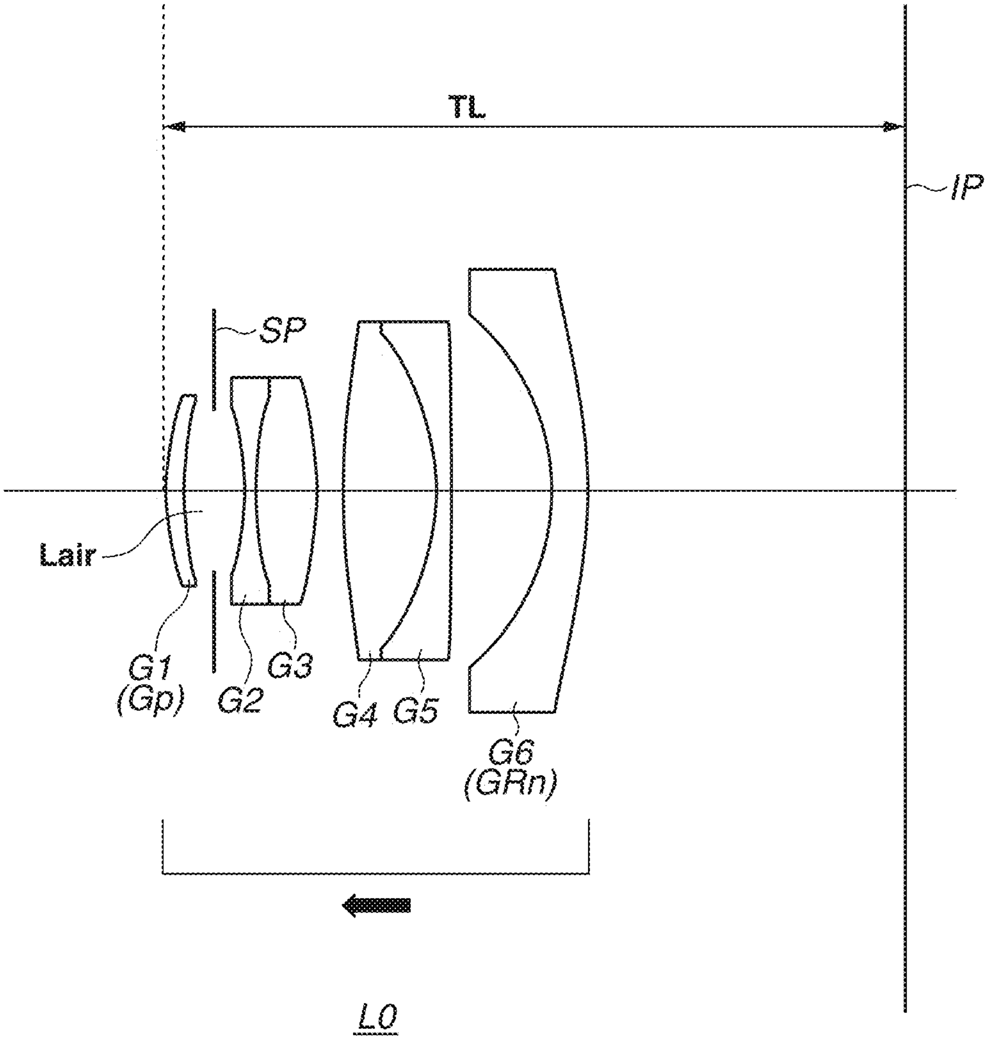
FIG. 9 is a cross-sectional view of an optical system according to a fifth exemplary embodiment when focusing on an object at infinity.
Figure 10:
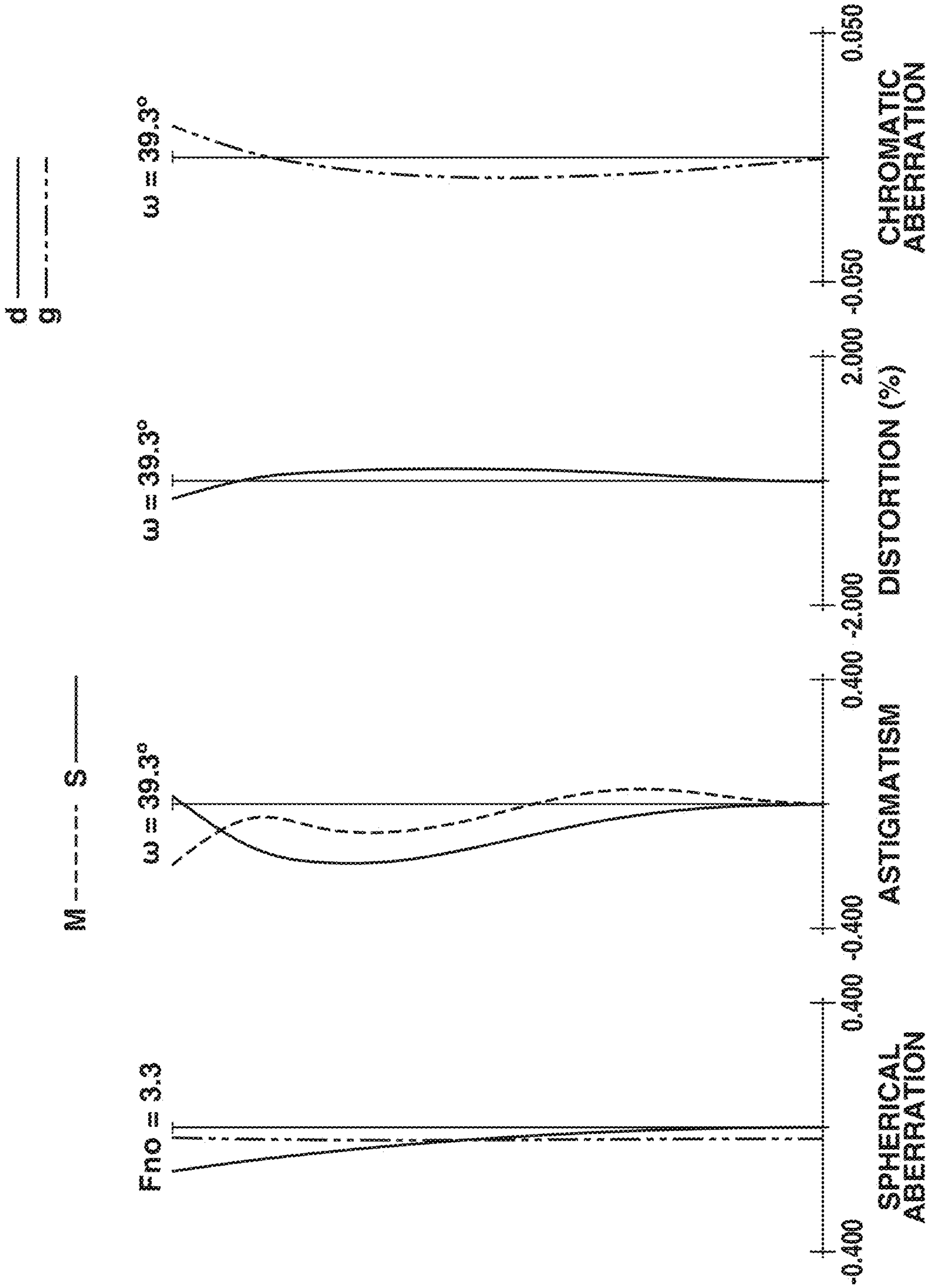
FIG. 10 is a longitudinal aberration diagram of the optical system according to the fifth exemplary embodiment.
Figure 11:
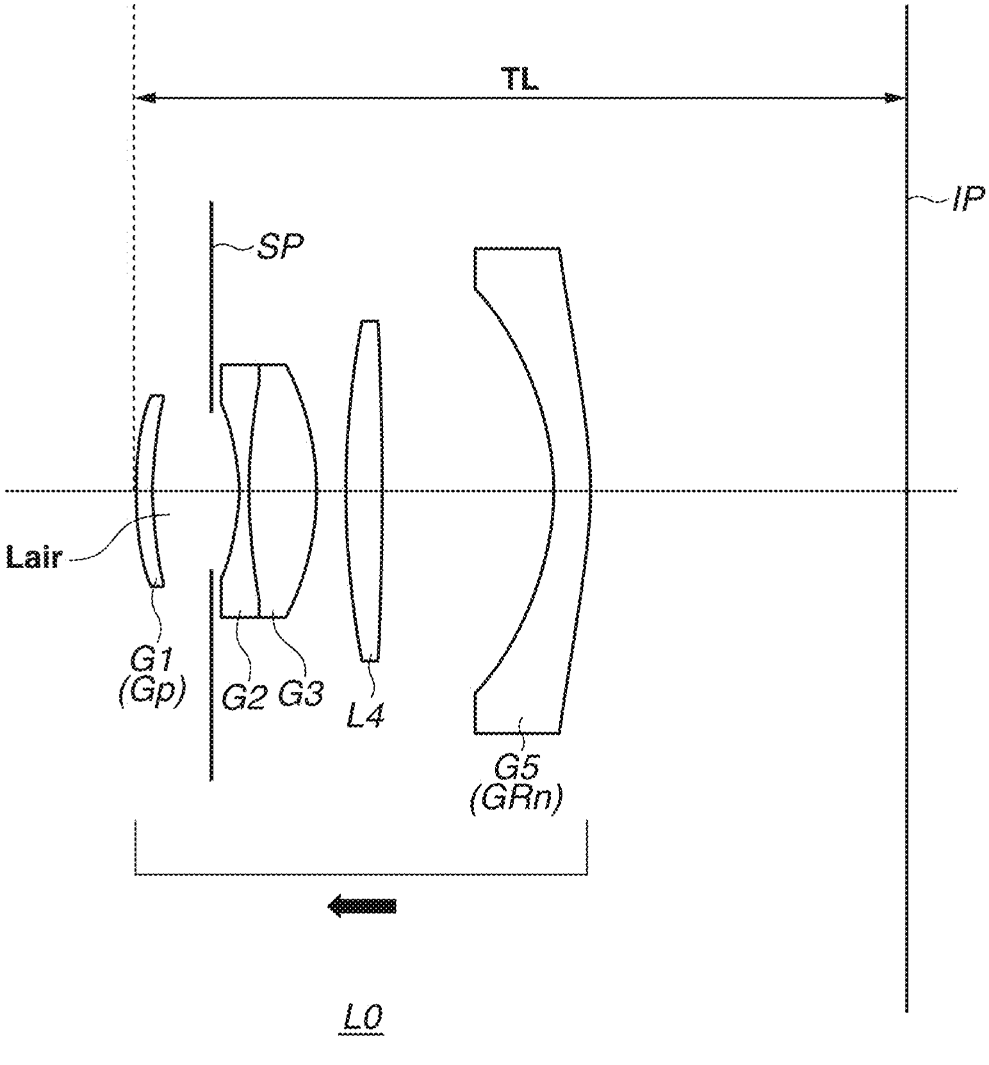
FIG. 11 is a cross-sectional view of an optical system according to a sixth exemplary embodiment when focusing on an object at infinity.
Figure 12:
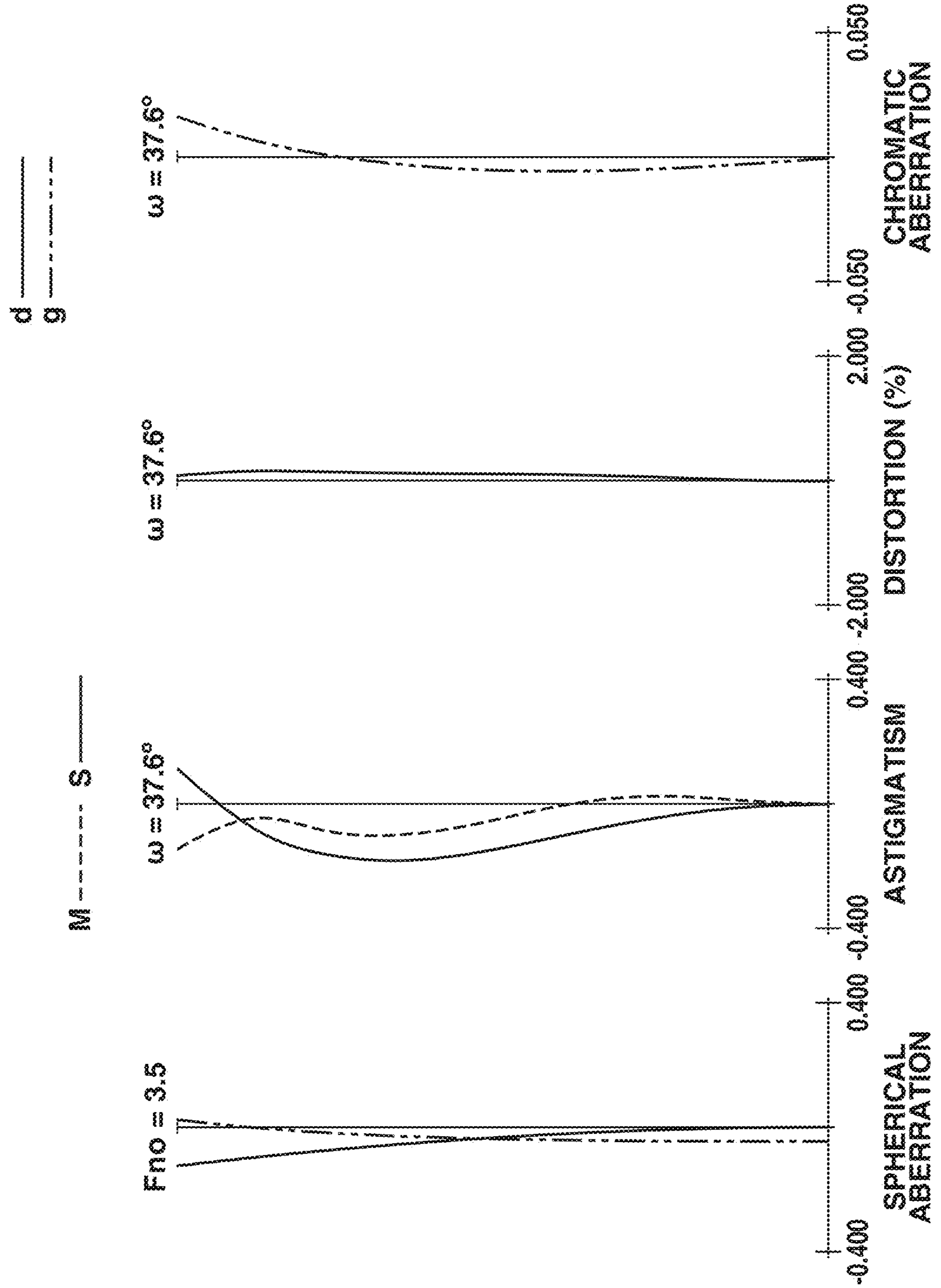
FIG. 12 is a longitudinal aberration diagram of the optical system according to the sixth exemplary embodiment.
Figure 13:
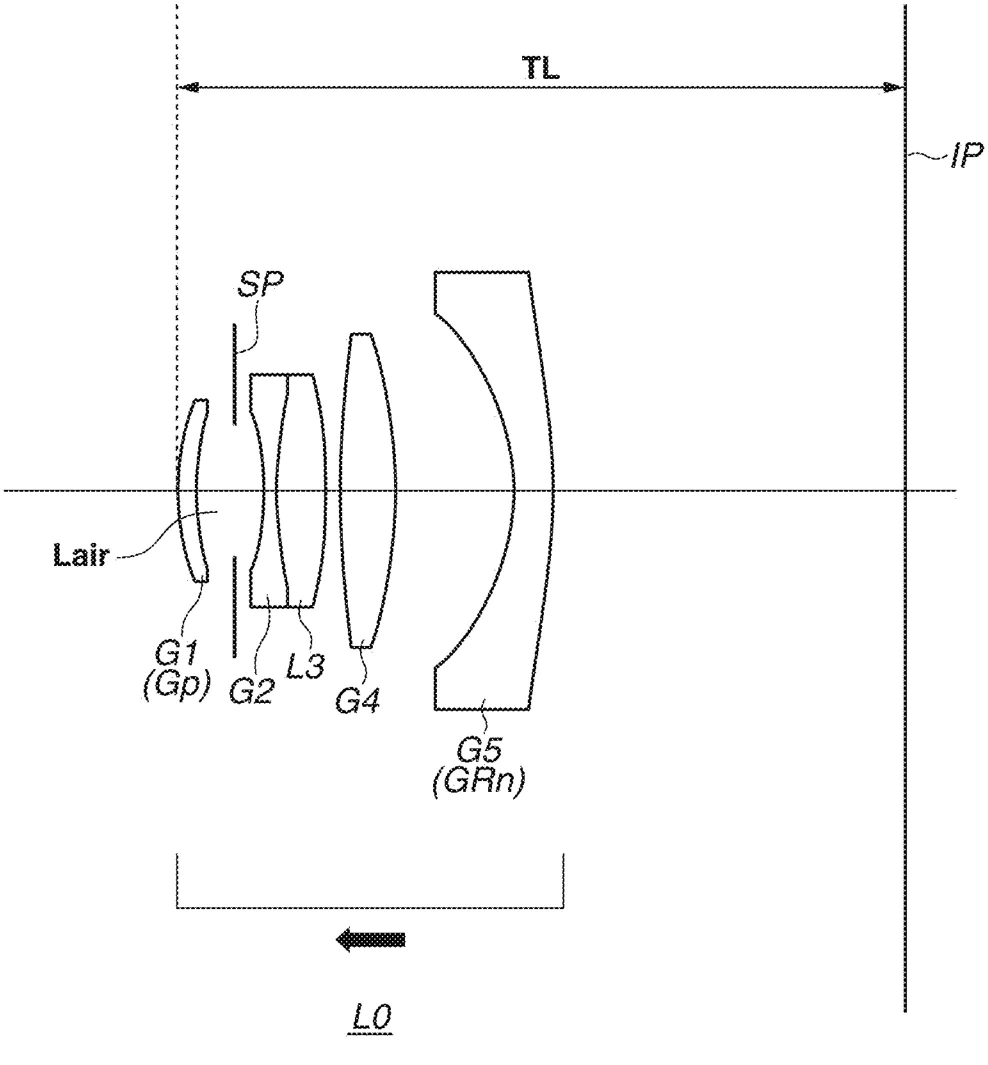
FIG. 13 is a cross-sectional view of an optical system according to a seventh exemplary embodiment when focusing on an object at infinity.
Figure 14:
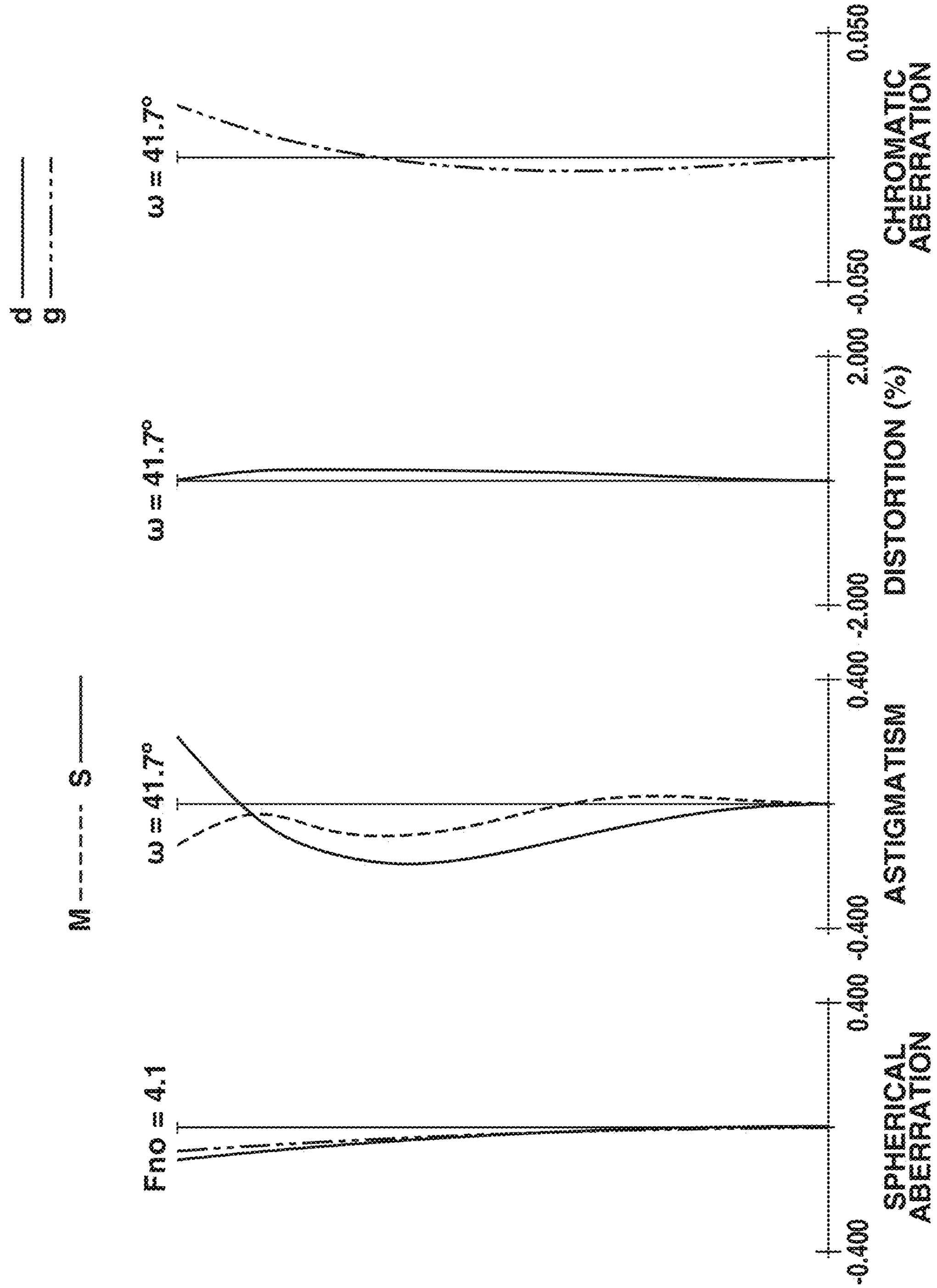
FIG. 14 is a longitudinal aberration diagram of the optical system according to the seventh exemplary embodiment.

An exemplary embodiment of the disclosure will be described with reference to the drawings. In each drawing, there may be cases where a scale is different from an actual scale for descriptive purposes. In each drawing, an identical member is denoted by an identical reference number, and a redundant description is omitted.

FIGS. 1, 3, 5, 7, 9, 11, and 13 are cross-sectional views illustrating respective optical systems L0 according to first to seventh exemplary embodiments when focusing on an object at infinity. In each cross-sectional view, the left side corresponds to an object side (front side), and the right side corresponds to an image side (back side). The optical systems L0 according to the respective exemplary embodiments are each configured to include a plurality of lenses.

In each drawing, a lens Gi is an i-th lens (i is a natural number) counted from the object side of the lenses included in the optical system L0. A positive lens element Gp is a positive lens element having positive refractive power, and a final lens GRn is a lens disposed closest to the image and having negative refractive power. A lens element is a single lens or a cemented lens composed of a plurality of lenses. The cemented lens according to each exemplary embodiment is cemented by application of an adhesive or the like to between two or more lenses.

Each drawing illustrates an aperture stop SP and an image plane IP. In a case where the optical system L0 according to each exemplary embodiment is used as an imaging optical system for a digital video camera or a digital still camera, an imaging plane of a solid-state image pickup element (photoelectric conversion element) is arranged on the image plane IP. As the solid-state image pickup element, a charge-coupled device (CCD) sensor, a complementary metal-oxide semiconductor (CMOS) sensor, or the like can be used. In a case where the optical system L0 according to each exemplary embodiment is used as an imaging optical system for a silver-halide film camera, a photosensitive surface of a film is arranged on the image plane IP.

An arrow in each drawing represents a movement locus of each lens at the time of focusing from an infinite end to a short range (close end). In each exemplary embodiment, the whole of the optical system L0 moves from the image side to the object side at the time of focusing. Alternatively, focusing may be performed by movement of part of lenses in the optical system L0 from the image side to the object side or from the object side to the image side.

FIGS. 2, 4, 6, 8, 10, 12, and 14 are aberration diagrams of the respective optical systems L0 according to the first to seventh exemplary embodiments when focusing on an object at infinity.

In each drawing, Fno represents an F-number and ω represents an imaging half angle of view (°) obtained by paraxial calculation. In a spherical aberration diagram, a solid line represents a spherical aberration for the d-line (a wavelength of 587.6 nm), and an alternate long and two short dashes line represents a spherical aberration for the g-line (a wavelength of 435.8 nm). In an astigmatism diagram, a solid line represents astigmatism for the d-line on a sagittal image plane, and a broken line represents astigmatism for the d-line on a meridional image plane. A distortion diagram illustrates distortion for the d-line. A chromatic aberration diagram illustrates a magnification chromatic aberration for the g-line.

Next, characteristic configurations of the optical system L0*s* according to respective exemplary embodiments are described.

The optical system L0 according to each of the exemplary embodiments is composed of six or less lenses and includes a plurality of positive lenses. When an attempt is made to downsize the optical system L0, the refractive power of a positive lens tends to be stronger. At this time, sharing the strong refractive power among a plurality of positive lenses makes it possible to weaken the refractive power per positive lens. As a result, it is possible to satisfactorily correct various aberrations, such as a field curvature, a spherical aberration, and an on-axis chromatic aberration. The optical system L0 includes the final lens GRn disposed closest to the image and having negative refractive power. At a position the closest to the image plane of the optical system L0, a light flux sufficiently converges, and an on-axis light flux and an off-axis light flux pass respective positions separated from each other in a direction orthogonal to an optical axis on a lens surface. With the arrangement of the final lens GRn having negative refractive power, it is possible to decrease a positive Petzval sum as the whole of the optical system L0. As a result, it is possible to satisfactorily correct various aberrations, such as the field curvature. The number of lenses arranged in the optical system L0 is six or less. By configuring the optical system L0 to include six or less lenses, it is possible to downsize the optical system L0. In a case where the optical system L0 includes a cemented lens, the optical system L0 is configured to include six or less lenses in which a plurality of single lenses constituting the cemented lens is individually counted.

Next, conditions that are satisfied by the optical system L0 in each exemplary embodiment are described. The optical system L0 in each exemplary embodiment satisfies the following conditional inequalities (1) and (2).

In the inequalities, TL represents a total optical length obtained by addition of a back focus to a distance from a lens surface the closest to the object to a final lens surface in the optical system L0, ω[°] represents a half angle of view, and f represents a focal length of the whole system. Additionally, np12ave represents an average refractive index of a lens having the highest refractive index and a lens having the second highest refractive index among the plurality of positive lenses. The half angle of view may be defined by a half angle of view for light with which an image is formed at an end portion of an image circle in the optical system L0, or may be defined by a half angle of view for light with which an image is formed at a maximum image height of an image sensor of an imaging apparatus on which the optical system L0 is mounted.

$$0.50 < TL/(f \times \tan\omega) < 1.90 \quad (1)$$

$$1.80 < np12ave < 2.20 \quad (2)$$

In a case where TL/(f×tan ω) is below a lower limit value of the conditional inequality (1), the refractive power of each lens becomes too strong. As a result, a correction of the field curvature toward under-correction and a correction of the spherical aberration become difficult. Thus, TL/(f×tan ω) being below the lower limit value is not favorable. Moreover, because an incident angle of a light ray with respect to the image plane IP becomes too large and vignetting is likely to occur, TL/(f×tan ω) being below the lower limit value is not favorable. In a case where TL/(f×tan ω) exceeds an upper limit value of the conditional inequality (1), the total optical length TL becomes large. Thus, TL/(f×tan ω) exceeding the upper limit value is not favorable.

To downsize the optical system L0, making refractive power of each positive lens stronger is effective, but yet a Petzval sum tends to become larger. At this time, by increasing a refractive index of each positive lens, it is possible to decrease the Petzval sum and correct the field curvature.

In a case where np12ave is below a lower limit value of the conditional inequality (2), a positive Petzval sum becomes too large. As a result, a correction of the field curvature toward under-correction becomes difficult. Thus, np12ave being below the lower limit value is not favorable. In a case where np12ave exceeds an upper limit value of the conditional inequality (2), chromatic dispersion of a material becomes too large. As a result, a correction of the on-axis chromatic aberration becomes difficult. Thus, np12ave exceeding the upper limit value is not favorable.

In the first, fifth, and seventh exemplary embodiments, the lens having the highest refractive index and the lens having the second highest refractive index are a first lens G1 and a fourth lens G4 (the first lens G1 and the fourth lens G4 have an identical refractive index). In a case where there are two lenses having the highest refractive index in the present exemplary embodiment, one of the two lenses is assumed to be the lens having the highest refractive index and the other of the two is assumed to be the lens having the second highest refractive index. In the second exemplary embodiment, the lens having the highest refractive index is a third lens G3, and the lens having the second highest refractive index is the fourth lens G4. In the third exemplary embodiment, the lens having the highest refractive index is the first lens G1, and the lens having the second highest refractive index is the fourth lens G4 and a fifth lens G5 (the fourth lens G4 and the fifth lens G5 have an identical refractive index). In the fourth exemplary embodiment, the lens having the highest refractive index is the first lens G1, and the lens having the second highest refractive index is the third lens G3.

In one embodiment, the following conditional inequalities (1a) and (2a) be satisfied.

$$0.70 < TL/(f \times \tan\omega) < 1.85 \quad (1a)$$

$$1.82 < np12ave < 2.15 \quad (2a)$$

In another embodiment, the following conditional inequalities (1b) and (2b) be satisfied.

$$0.90 < TL/(f \times \tan\omega) < 1.78 \quad (1b)$$

$$1.84 < np12ave < 2.10 \quad (2b)$$

Furthermore, the following conditional inequalities (1c) and (2c) being satisfied makes it possible to obtain maximum effects intended by the respective conditional inequalities.

$$1.10 < TL/(f \times \tan\omega) < 1.72 \quad (1c)$$

$$1.85 < np12ave < 2.05 \quad (2c)$$

The optical system L0 in each of the third, fifth, and seventh exemplary embodiments includes a cemented lens composed of a positive lens and a negative lens on the image side of the aperture stop SP. With such a configuration, it is possible to satisfactorily correct the on-axis chromatic aberration. Furthermore, at least one cemented lens arranged on the image side of the aperture stop SP is a cemented lens composed of a negative lens and a positive lens arranged in this order from the object side. In one embodiment, an absolute value of refractive power of the positive lens is larger than an absolute value of refractive power of the negative lens. With such a configuration, it is possible to decrease the Petzval sum and satisfactorily correct the field curvature.

At least one of lens surfaces of the final lens GRn according to of the first, third, and fifth exemplary embodiments is an aspheric surface. With such a configuration, it is possible to satisfactorily correct the astigmatism and distortion aberration. In one embodiment, the aspheric surface of the final lens GRn on the image side includes a convex surface region in the neighborhood of the optical axis, and yet in another embodiment, the aspheric surface of the final lens GRn on the image side includes a concave surface region on the periphery. Furthermore, in the case where the final lens GRn is a lens having an aspheric surface, a material of the lens is a resin material, such as plastic, to reduce weight of the lens.

The neighborhood of the optical axis mentioned herein represents a paraxial region. In a case of an aspheric surface lens, the concave surface and the convex surface in the neighborhood of the optical axis are defined by respective signs of a paraxial curvature radius. The positive/negative of refractive power is similarly calculated from the paraxial curvature radius.

In the optical system L0 according to each of the first to seventh exemplary embodiments includes a positive lens or a positive cemented lens arranged adjacent to the final lens GRn on the object side. With such a configuration, it is possible to satisfactorily correct the magnification chromatic aberration and the distortion aberration.

The lens surface on the object side of the first lens G1 according to each of the first to seventh exemplary embodiments is a convex surface. With such a configuration, it is possible to suppress the occurrence of the spherical aberration toward under-correction in the first lens G1.

The final lens GRn in each of the exemplary embodiments is a meniscus lens whose concave surface faces the object side. With such a configuration, it is possible to suppress the occurrence of the distortion aberration.

Part or all of the lenses in the optical system L0 in each of the exemplary embodiments may be configured to be movable in a direction having a vertical component relative to the optical axis of the optical system L0. With such a configuration, when image blurring occurs due to a hand shake or the like, the movement of part or all of the lenses in the direction having the vertical component relative to the optical axis of the optical system L0 enables correction of image blurring.

Next, conditions that are satisfied by the optical system L0 according to each of the exemplary embodiments are described.

The optical system L0 includes the positive lens element Gp and a first negative lens in this order from the object side. The positive lens element Gp includes a first positive lens having positive refractive power. The positive lens element Gp, in one embodiment, is either a positive single lens or a cemented lens having positive refractive power as a whole. With such a configuration, it is possible to satisfactorily correct the spherical aberration and the on-axis chromatic aberration. Additionally, the lens surface of the first negative lens on the object side is a concave surface. With such a configuration, the lens surface has a substantially concentric surface shape with respect to an off-axis light flux incident from the object side, and it is possible to decrease a comatic aberration and astigmatism for the off-axis light flux.

In one embodiment, the optical system L0 includes at least three positive lenses. When an attempt is made to downsize a total length of the optical system L0, the refractive power of a positive lens is to be made stronger, but the correction of the spherical aberration and the on-axis chromatic aberration becomes difficult. For this reason, arranging at least three positive lenses can weaken refractive power per lens. As a result, it is possible to prevent the occurrence of the above-mentioned aberrations.

In one embodiment, the optical system L0 includes a second positive lens arranged on the image side of the first negative lens. Since the arrangement of the additional positive lens on the image side of the first negative lens enables sharing of positive refractive power among a plurality of lenses, it is possible to prevent the spherical aberration and the on-axis chromatic aberration.

Additionally, the aperture stop SP is arranged adjacent to any one of the positive lens element Gp, the first negative lens, and the second positive lens on the image side. With such a configuration, it is possible to increase a distance from the aperture stop SP to the image plane IP. As a result, it is possible to decrease an incident angle of an off-axis ray incident on the image plane IP.

In another embodiment, the optical system L0 includes a third positive lens arranged on the image side of the second positive lens. With the arrangement of two positive lenses on the image side of the first negative lens, in addition to obtaining the above-mentioned effect of suppressing the spherical aberration and the like, it is possible to mitigate the incident angle of the off-axis ray with respect to the image plane IP and correct the astigmatism.

Furthermore, in one embodiment, in the optical system L0, a lens surface on the image side of each positive lens arranged on the image side of the first negative lens is a convex surface. With such a configuration, it is possible to reduce the comatic aberration and the astigmatism.

The optical system L0 according to each of the exemplary embodiments satisfies at least one or more of the following conditional inequalities (3) to (12).

In the conditional inequalities, a focal length of the positive lens element Gp is fGp, a focal length of the first negative lens is fGn, and a focal length of an air lens Lair having the strongest negative refractive power of air lenses each composed of an air space, a lens surface on the object side of the air space, and a lens surface on the image side of the air space in the optical system L0, is fnair. Additionally, a focal length of the final lens GRn is fGRn, a refractive index of the lens having the highest refractive index of the plurality of positive lenses is np1, a diameter of the aperture stop SP at a maximum aperture is D, and a distance on the optical axis from the aperture stop SP to the image plane IP is T. A curvature radius of a surface of the positive lens element Gp the closest to the object is GpR1, a curvature radius of a surface of the positive lens element Gp the closest to the image is GpR2, a curvature radius of a surface of the final lens GRn on the object side is GRnR1, and a curvature radius of a surface of the final lens GRn on the image side is GRnR2.

$$-10.00 < fGp/fGn < -1.45 \quad (3)$$

$$-1.50 < fnair/fGp < -0.01 \quad (4)$$

$$-1.00 < fnair/f < -0.05 \quad (5)$$

$$-3.50 < fGRn/f < -0.20 \quad (6)$$

$$-2.00 < (GpR2 + GpR1)/(GpR2 - GpR1) < 20.00 \quad (7)$$

$$1.81 < np1 < 2.20 \quad (8)$$

$$1.00 < (GRnR2 + GRnR1)/(GRnR2 - GRnR1) < 8.00 \quad (9)$$

$$2.50 < T/D < 12.00 \quad (10)$$

$$0.05 < f/fGp < 2.00 \quad (11)$$

$$-1.00 < fGn/f < -0.15 \quad (12)$$

The conditional inequality (3) is a conditional inequality for satisfactorily correcting various aberrations, such as the field curvature. When fGp/fGn is below a lower limit value of the conditional inequality (3), the refractive power of the positive lens element Gp becomes too weak, and the total optical length becomes too large. Thus, fGp/fGn being below the lower limit value is not favorable. On the other hand, when fGp/fGn exceeds an upper limit value of the conditional inequality (3), the Petzval sum of the optical system L0 becomes too large, and the correction of the field curvature and the spherical aberration becomes difficult. Thus, fGp/fGn exceeding the upper limit value is not favorable.

The conditional inequality (4) is a conditional inequality for satisfactorily correcting various aberrations, such as the field curvature. When fnair/fGp is below a lower limit value of the conditional inequality (4), a value of fGp becomes too small, and the Petzval sum of the optical system L0 becomes large. As a result, the correction of the field curvature becomes difficult. Thus, fnair/fGp being below the lower limit value is not favorable. On the other hand, when fnair/fGp exceeds an upper limit value of the conditional inequality (4), the negative refractive power of the air lens Lair becomes too strong, and the spherical aberration and the on-axis chromatic aberration are to be over-corrected. Thus, fnair/fGp exceeding the upper limit value is not favorable.

The conditional inequality (5) is a conditional inequality for satisfactorily correcting various aberrations, such as the field curvature, the spherical aberration, and the on-axis chromatic aberration. When fnair/f is below a lower limit value of the conditional inequality (5), the negative refractive power of the air lens Lair becomes too weak, and the field curvature, the spherical aberration, and the on-axis chromatic aberration are to be under-corrected. Thus, fnair/f being below the lower limit value is not favorable.

On the other hand, when fnair/f exceeds an upper limit value of the conditional inequality (5), the negative refractive power of the air lens Lair becomes too strong, and the spherical aberration and the on-axis chromatic aberration are to be over-corrected. Thus, fnair/f exceeding the upper limit value is not favorable.

The conditional inequality (6) is a conditional inequality for preventing the occurrence of an off-axis aberration in a sagittal direction. When fGRn/f is below a lower limit value of the conditional inequality (6), the negative refractive power of the final lens GRn becomes too weak, and the field curvature is to be under-corrected. Thus, fGRn/f being below the lower limit value is not favorable. On the other hand, when fGRn/f exceeds an upper limit value of the conditional inequality (6), the negative refractive power of the final lens GRn becomes too strong, and the field curvature is to be over-corrected. Thus, fGRn/f exceeding the upper limit value is not favorable.

The conditional inequality (7) is a conditional inequality for preventing the occurrence of various aberrations, such as the astigmatism and the distortion aberration. When (GpR2+GpR1)/(GpR2−GpR1) is below a lower limit value of the conditional inequality (7), concentricity of the positive lens element Gp becomes too low, and amounts of various aberrations increase. Thus, (GpR2+GpR1)/(GpR2−GpR1) being below the lower limit value is not favorable. On the other hand, when (GpR2+GpR1)/(GpR2−GpR1) exceeds an upper limit value of the conditional inequality (7), the refractive power of the positive lens element Gp becomes too weak, and the total optical length becomes too large. Thus, (GpR2+GpR1)/(GpR2−GpR1) exceeding the upper limit value is not favorable.

The conditional inequality (8) is a conditional inequality for satisfactorily correcting the field curvature. When np1 is below a lower limit value of the conditional inequality (8), the positive Petzval sum becomes too large, and the correction of the field curvature toward under-correction becomes difficult. Thus, np1 being below the lower limit value is not favorable. On the other hand, when np1 exceeds an upper limit value of the conditional inequality (8), the chromatic dispersion of the material becomes too large, and the correction of the on-axis chromatic aberration becomes difficult. Thus, np1 exceeding the upper limit value is not favorable. Among the plurality of positive lenses arranged in the optical system L0, the lens having the highest refractive index is the first lens G1 and the fourth lens G4 in the first and fifth exemplary embodiments. The lens having the highest refractive index is the third lens G3 in the second and fourth exemplary embodiments, and is the first lens G1 in the third and seventh exemplary embodiments. The lens having the highest refractive index is the fourth lens G4 in the sixth exemplary embodiment.

The conditional inequality (9) is a conditional inequality for preventing the occurrence of various aberrations, such as the distortion aberration. When (GRnR2+GRnR1)/(GRnR2−GRnR1) is below a lower limit value of the conditional inequality (9), the incident angle of the off-axis ray incident on the image plane IP becomes too large, or an amount of the distortion aberration increases. Thus, (GRnR2+GRnR1)/(GRnR2-GRnR1) being below the lower limit value is not favorable. On the other hand, when (GRnR2+GRnR1)/(GRnR2−GRnR1) exceeds an upper limit value of the conditional inequality (9), the refractive power of the final lens GRn becomes too weak, and it becomes difficult to satisfactorily correct the field curvature. Thus, (GRnR2+GRnR1)/(GRnR2−GRnR1) exceeding the upper limit value is not favorable.

The conditional inequality (10) is a conditional inequality regarding a ratio between a diameter D of the aperture stop SP at a maximum aperture and a distance T from the aperture stop SP to the image plane IP on the optical axis. When T/D is below a lower limit value of the conditional inequality (10), the incident angle of the off-axis ray incident on the image plane IP becomes too large. Thus, T/D being below the lower limit value is not favorable. On the other hand, when T/D exceeds an upper limit value of the conditional inequality (10), the total optical length becomes large. Thus, T/D exceeding the upper limit value is not favorable.

The conditional inequality (11) is a conditional inequality for satisfactorily correcting the field curvature. When f/fGp is below a lower limit value of the conditional inequality (11), the refractive power of the positive lens element Gp becomes too weak, and the total optical length becomes too large. Thus, f/fGp being below the lower limit value is not favorable. When f/fGp exceeds an upper limit value of the conditional inequality (11), the refractive power of the positive lens element Gp becomes too strong, and the Petzval sum of the optical system L0 becomes large. As a result, the correction of the field curvature becomes difficult. Thus, f/fGp exceeding the upper limit value is not favorable.

The conditional inequality (12) is a conditional inequality for satisfactorily correcting the field curvature. When fGn/f is below a lower limit value of the conditional inequality (12), the refractive power of a negative lens Gn becomes too weak, and the correction of the field curvature becomes difficult. Thus, fGn/f being below the lower limit value is not favorable. On the other hand, when fGn/f exceeds the upper limit value of the conditional inequality (12), the negative refractive power becomes too strong, and the field curvature and the spherical aberration are to be over-corrected. Thus, fGn/f exceeding the upper limit value is not favorable.

In one embodiment, the following conditional inequalities (3a) to (12a) be satisfied.

$$-9.00 < fGp/fGn < -1.60 \quad (3a)$$

$$-1.30 < fnair/fGp < -0.03 \quad (4a)$$

$$-0.85 < fnair/f < -0.10 \quad (5a)$$

$$-3.10 < fGRn/f < -0.35 \quad (6a)$$

$$-1.00 < (GpR2 + GpR1)/(GpR2 - GpR1) < 18.00 \quad (7a)$$

$$1.83 < np1 < 2.15 \quad (8a)$$

$$1.20 < (GRnR2 + GRnR1)/(GRnR2 < -GRnR1) < 7.00 \quad (9a)$$

-continued $$3.00 < T/D < 11.00 \quad (10a)$$

$$0.15 < f/fGp < 1.85 \quad (11a)$$

$$-0.90 < fGn/f < -0.20 \quad (12a)$$

In another embodiment, the following conditional inequalities (3b) to (12b) be satisfied.

$$-8.00 < fGp/fGn < -1.75 \quad (3b)$$

$$-1.10 < fnair/fGp < -0.05 \quad (4b)$$

$$-0.70 < fnair/f < -0.15 \quad (5b)$$

$$-2.70 < fGRn/f < 0.50 \quad (6b)$$

$$0.00 < (GpR2 + GpR1)/(GpR2 - GpR1) < 16.00 \quad (7b)$$

$$1.85 < np1 < 2.13 \quad (8b)$$

$$1.40 < (GRnR2 + GRnR1)/(GRnR2 - GRnR1) < 6.00 \quad (9b)$$

$$3.50 < T/D < 10.00 \quad (10b)$$

$$0.25 < f/fGp < 1.70 \quad (11b)$$

$$-0.80 < fGn/f < -0.25 \quad (12b)$$

Yet in another embodiment, the following conditional inequalities (3c) to (12c) be satisfied.

$$-6.50 < fGp/fGn < -1.90 \quad (3c)$$

$$-0.90 < fnair/fGp < -0.07 \quad (4c)$$

$$-0.55 < fnair/f < -0.18 \quad (5c)$$

$$-2.30 < fGRn/f < -0.65 \quad (6c)$$

$$0.20 < GpR2 + GpR1)/(GpR2 - GpR1) < 14.00 \quad (7c)$$

$$1.87 < np1 < 2.12 \quad (8c)$$

$$1.60 < (GRnR2 + GRnR1)/(GRnR2 - GRnR1) < 5.00 \quad (9c)$$

$$4.00 < T/D < 9.00 \quad (10c)$$

$$0.35 < f/fGp < 1.55 \quad (11c)$$

$$-0.70 < fGn/f < -0.30 \quad (12c)$$

Next, a specific configuration of the optical system L0 according to each of the exemplary embodiments is described.

The optical system L0 according to the first exemplary embodiment includes the first lens G1 having positive refractive power, a second lens G2 having negative refractive power, the third lens G3 having positive refractive power, the fourth lens G4 having positive refractive power, and the fifth lens G5 having negative refractive power. The aperture stop SP is arranged on the image side of the first lens G1. In the first exemplary embodiment, the positive lens element Gp having positive refractive power is composed of the first lens G1, and the final lens GRn is the fifth lens G5. The air lens Lair having the strongest negative refractive power is formed of a lens surface of the first lens G1 on the image side and a lens surface of the second lens G2 on the object side.

The optical system L0 according to the second exemplary embodiment has a configuration similar to that of the optical system L0 according to the first exemplary embodiment.

The optical system L0 according to the third exemplary embodiment is composed of the first lens G1 having positive refractive power, the second lens G2 having negative refractive power, the third lens G3 having negative refractive power, the fourth lens G4 having positive refractive power, the fifth lens G5 having positive refractive power, and a sixth lens G6 having negative refractive power. The aperture stop SP is arranged on the image side of the first lens G1. In the third exemplary embodiment, the positive lens element Gp is a cemented lens composed of the first lens G1 and the second lens G2 (negative lens), and the final lens GRn is the sixth lens G6.

Additionally, the air lens Lair having the strongest negative refractive power is formed of the lens surface of the second lens G2 on the image side and a lens surface of the third lens G3 on the object side.

The optical system L0 according to the fourth exemplary embodiment is different from that according to the first exemplary embodiment in that the aperture stop SP is arranged on the image side of the third lens G3.

The optical system L0 according to the fifth exemplary embodiment is composed of the first lens G1 having positive refractive power, the second lens G2 having negative refractive power, the third lens G3 having positive refractive power, the fourth lens G4 having positive refractive power, the fifth lens G5 having negative refractive power, and the sixth lens G6 having negative refractive power. The aperture stop SP is arranged on the image side of the first lens G1. In the fifth exemplary embodiment, the positive lens element Gp having positive refractive power is composed of the first lens G1, and the final lens GRn is the sixth lens G6. The air lens Lair having the strongest negative refractive power is formed of the lens surface of the first lens G1 on the image side and the lens surface of the second lens G2 on the object side.

The optical system L0 according to the sixth exemplary embodiment is different from that according to the first exemplary embodiment in that the optical system L0 includes a cemented lens composed of the second lens G2 and the third lens G3.

The optical system L0 according to the seventh exemplary embodiment has a configuration similar to that of the optical system L0 according to the sixth exemplary embodiment.

First to seventh numerical examples respectively corresponding to the first to seventh exemplary embodiment are described below.

In surface data of each numerical example, r represents a curvature radius of each optical surface, and d (mm) represents an on-axis interval (a distance on the optical axis) between an m-th surface and an (m+1)-th surface. Note that m is a surface number counted from the light incident side. In addition, nd is a refractive index of each optical member with respect to the d-line, and vd is an Abbe number of the optical member. Where refractive indices at the wavelengths of the Fraunhofer lines of d, F, C, and g (587.6 nm, 486.1 nm, 656.3 nm, and 435.8 nm, respectively) are Nd, NF, NC, and Ng, respectively, the Abbe number vd of a material is defined by the following formula.

$$vd=(Nd-1)/(NF-NC)$$

In each numerical example, d, a focal length (mm), an F-number, and a half angle of view) (° are values in a case where the optical system L0 in each of the exemplary embodiments is focused on an object at infinity. A back focus BF is a distance from the final lens surface to the image plane IP. A total optical length is a value obtained by addition of the back focus BF to a distance from the first lens surface to the final lens surface.

In a case where the optical surface is an aspheric surface, a sign "*" is added to the right side of a surface number. Where X represents a displacement amount from a surface vertex in an optical axis direction, h represents a height from the optical axis in a direction perpendicular to the optical axis, R represents a paraxial curvature radius, K represents a conic constant, and A4, A6, A8, and A10 represent aspheric surface coefficients for each order, an aspheric shape can be expressed by the following formula. In the formula, "e+XX" in each aspheric surface coefficient means "×10+xx".

$$x=(h^2/R)/\left[1+\{1+K)(h/R)^2\}^{1/2}\right]+A4\times h^4+A6\times h^6+A8\times h^8+A10\times h^{10}$$

First Numerical Example

| Unit: mm<br>Surface data | | | | |
|---|---|---|---|---|
| Surface number | r | d | nd | vd |
| 1 | 7.738 | 0.75 | 1.88100 | 40.1 |
| 2 | 9.062 | 1.16 | | |
| 3 (stop) | ∞ | 1.01 | | |
| 4 | −7.257 | 0.40 | 1.80809 | 22.8 |
| 5 | −21.613 | 0.10 | | |
| 6 | 150.190 | 2.39 | 1.77250 | 49.6 |
| 7 | −10.270 | 0.40 | | |
| 8 | 49.181 | 1.61 | 1.88100 | 40.1 |
| 9 | −38.910 | 4.69 | | |
| 10* | −9.168 | 1.30 | 1.53500 | 55.7 |
| 11* | −31.991 | 12.00 | | |
| Image plane | ∞ | | | |

| Aspheric surface data | | | |
|---|---|---|---|
| Tenth surface | | | |
| K = 0.00000e+00 | A 4 = −4.41101e−04 | A 6 = −1.45607e−06 | A 8 = 6.00534e−08 |
| Eleventh surface | | | |
| K = 0.00000e+00 | A 4 = −1.19673e−04 | A 6 = 3.67228e−06 | A 8 = −1.93542e−08 |

| | |
|---|---|
| Focal length | 21.40 |
| F-number | 5.60 |
| Angle of view | 45.31 |
| Image height | 21.64 |
| Total optical length | 25.80 |
| BF | 12.00 |

| Single lens data | | |
|---|---|---|
| Lens | Starting surface | Focal length |
| 1 | 1 | 47.50 |
| 2 | 4 | −13.69 |
| 3 | 6 | 12.53 |
| 4 | 8 | 24.87 |
| 5 | 10 | −24.51 |

Second Numerical Example

| Unit: mm<br>Surface data | | | | |
|---|---|---|---|---|
| Surface number | r | d | nd | vd |
| 1 | 11.834 | 1.02 | 1.51742 | 52.4 |
| 2 | −25.826 | 0.06 | | |
| 3 (stop) | ∞ | 0.47 | | |
| 4 | −7.218 | 0.40 | 1.78880 | 28.4 |
| 5 | 47.558 | 0.30 | | |
| 6 | −30.165 | 1.15 | 1.90043 | 37.4 |
| 7 | −9.008 | 1.62 | | |
| 8 | −25.232 | 1.77 | 1.87070 | 40.7 |
| 9 | −9.587 | 6.38 | | |
| 10 | −8.488 | 0.85 | 1.85150 | 40.8 |
| 11 | −20.683 | 12.00 | | |
| Image plane | ∞ | | | |

| | |
|---|---|
| Focal length | 23.29 |
| F-number | 8.00 |
| Angle of view | 42.90 |
| Image height | 21.64 |
| Total optical length | 26.00 |
| BF | 12.00 |

| Single lens data | | |
|---|---|---|
| Lens | Starting surface | Focal length |
| 1 | 1 | 15.83 |
| 2 | 4 | −7.92 |
| 3 | 6 | 13.91 |
| 4 | 8 | 16.87 |
| 5 | 10 | −17.47 |

Third Numerical Example

| Unit: mm<br>Surface data | | | | |
|---|---|---|---|---|
| Surface number | r | d | nd | vd |
| 1 | 14.659 | 1.08 | 1.95375 | 32.3 |
| 2 | 30.241 | 0.45 | 1.84666 | 23.8 |
| 3 | 18.784 | 2.18 | | |
| 4 (stop) | ∞ | 1.73 | | |
| 5 | −11.073 | 0.50 | 1.75211 | 25.0 |
| 6 | 40.242 | 2.81 | 1.88300 | 40.8 |
| 7 | −20.286 | 0.20 | | |
| 8 | 71.833 | 3.32 | 1.88300 | 40.8 |
| 9 | −21.327 | 6.04 | | |
| 10* | −10.968 | 1.70 | 1.53500 | 55.7 |
| 11* | −21.394 | 14.99 | | |
| Image plane | ∞ | | | |

| Aspheric surface data | | | |
|---|---|---|---|
| Tenth surface | | | |
| K = 0.00000e+00 | A 4 = 1.10643e−04 | A 6 = −2.30262e−08 | A 8 = −2.90550e−09 |
| Eleventh surface | | | |
| K = 0.00000e+00 | A 4 = 1.79791e−04 | A 6 = −5.25593e−07 | |

| | |
|---|---|
| Focal length | 26.30 |
| F-number | 3.20 |
| Angle of view | 39.45 |
| Image height | 21.64 |
| Total optical length | 35.00 |
| BF | 14.99 |

| Single lens data | | |
|---|---|---|
| Lens | Starting surface | Focal length |
| 1 | 1 | 28.85 |
| 2 | 2 | −59.64 |
| 3 | 5 | −11.50 |
| 4 | 6 | 15.61 |
| 5 | 8 | 18.94 |
| 6 | 10 | −44.60 |

Fourth Numerical Example

| Unit: mm<br>Surface data | | | | |
|---|---|---|---|---|
| Surface number | r | d | nd | vd |
| 1 | 7.005 | 1.09 | 1.90043 | 37.4 |
| 2 | 9.014 | 0.68 | | |
| 3 | −37.330 | 0.40 | 1.80810 | 22.8 |
| 4 | 8.070 | 0.11 | | |
| 5 | 11.644 | 1.38 | 2.00100 | 29.1 |
| 6 | −32.110 | | 0.16 | |
| 7 (stop) | ∞ | 4.03 | | |
| 8 | −16.915 | 1.84 | 1.77250 | 49.6 |
| 9 | −10.041 | 4.26 | | |
| 10 | −9.273 | 0.85 | 1.62004 | 36.3 |
| 11 | −14.975 | 12.00 | | |
| Image plane | ∞ | | | |

| | |
|---|---|
| Focal length | 23.29 |
| F-number | 8.00 |
| Angle of view | 42.89 |
| Image height | 21.64 |
| Total optical length | 26.80 |
| BF | 12.00 |

| Single lens data | | |
|---|---|---|
| Lens | Starting surface | Focal length |
| 1 | 1 | 27.75 |
| 2 | 3 | −8.18 |
| 3 | 5 | 8.67 |
| 4 | 8 | 28.65 |
| 5 | 10 | −41.66 |

Fifth Numerical Example

| Unit: mm<br>Surface data | | | | |
|---|---|---|---|---|
| Surface number | r | d | nd | vd |
| 1 | 12.769 | 0.84 | 2.00100 | 29.1 |
| 2 | 16.333 | 1.40 | | |
| 3 (stop) | ∞ | 1.52 | | |
| 4 | −13.660 | 0.50 | 1.69895 | 30.1 |
| 5 | 15.694 | 2.86 | 1.77250 | 49.6 |
| 6 | −19.634 | 1.31 | | |
| 7 | 41.421 | 4.39 | 2.00100 | 29.1 |
| 8 | −12.109 | 0.70 | 1.84666 | 23.8 |
| 9 | −168.023 | 4.77 | | |
| 10* | −9.977 | 1.70 | 1.53500 | 55.7 |
| 11* | −17.748 | 15.01 | | |
| Image plane | ∞ | | | |

Aspheric surface data

Tenth surface

K = 0.00000e+00　A 4 = 1.61874e−04　A 6 = −3.94009e−07

Eleventh surface

K = 0.00000e+00　A 4 = 2.26750e−04　A 6 = −6.64754e−07

| | |
|---|---|
| Focal length | 26.50 |
| F-number | 3.30 |
| Angle of view | 39.23 |
| Image height | 21.64 |
| Total optical length | 35.00 |
| BF | 15.01 |

| Single lens data | | |
|---|---|---|
| Lens | Starting surface | Focal length |
| 1 | 1 | 52.31 |
| 2 | 4 | −10.38 |
| 3 | 5 | 11.70 |
| 4 | 7 | 9.76 |
| 5 | 8 | −15.44 |
| 6 | 10 | −46.11 |

Sixth Numerical Example

| Unit: mm<br>Surface data | | | | |
|---|---|---|---|---|
| Surface number | r | d | nd | vd |
| 1 | 14.396 | 0.81 | 2.00069 | 25.5 |
| 2 | 18.559 | 2.77 | | |
| 3 (stop) | ∞ | 1.30 | | |
| 4 | −10.693 | 0.50 | 1.75211 | 25.0 |
| 5 | 29.792 | 3.20 | 1.81600 | 46.6 |
| 6 | −13.198 | 1.37 | | |
| 7 | 41.129 | 1.73 | 2.00100 | 29.1 |

-continued

| Unit: mm Surface data | | | | |
|---|---|---|---|---|
| Surface number | r | d | nd | νd |
| 8 | −165.450 | 8.12 | | |
| 9* | −12.336 | 1.70 | 1.53500 | 55.7 |
| 10* | −21.128 | 15.00 | | |
| Image plane | ∞ | | | |

| Aspheric surface data | | |
|---|---|---|
| Ninth surface | | |
| K = 0.00000e+00 | A 4 = 1.19175e−04 | A 6 = −2.16613e−07 |
| Tenth surface | | |
| K = 0.00000e+00 | A 4 = 1.62337e−04 | A 6 = −3.78328e−07 |

| | |
|---|---|
| Focal length | 28.07 |
| F-number | 3.50 |
| Angle of view | 37.62 |
| Image height | 21.64 |
| Total optical length | 36.50 |
| BF | 15.00 |

| Single lens data | | |
|---|---|---|
| Lens | Starting surface | Focal length |
| 1 | 1 | 58.43 |
| 2 | 4 | −10.41 |
| 3 | 5 | 11.60 |
| 4 | 7 | 33.05 |
| 5 | 9 | −59.42 |

Seventh Numerical Example

| Unit: mm Surface data | | | | |
|---|---|---|---|---|
| Surface number | r | d | nd | νd |
| 1 | 10.406 | 0.78 | 2.00100 | 29.1 |
| 2 | 12.421 | 1.66 | | |
| 3 (stop) | ∞ | 1.24 | | |
| 4 | −10.798 | 0.50 | 1.75211 | 25.0 |
| 5 | 18.724 | 2.14 | 1.88300 | 40.8 |
| 6 | −21.507 | 0.61 | | |
| 7 | 45.977 | 2.35 | 1.90043 | 37.4 |
| 8 | −21.959 | 5.02 | | |
| 9* | −9.730 | 1.70 | 1.53500 | 55.7 |
| 10* | −18.575 | 15.00 | | |
| Image plane | ∞ | | | |

| Aspheric surface data | | |
|---|---|---|
| Ninth surface | | |
| K = 0.00000e+00 | A 4 = 1.46126e−04 | A 6 = −9.47401e−07 |
| Tenth surface | | |
| K = 0.00000e+00 | A 4 = 2.69634e−04 | A 6 = −8.89847e−07 |

| | |
|---|---|
| Focal length | 24.29 |
| F-number | 4.10 |
| Angle of view | 41.69 |
| Image height | 21.64 |
| Total optical length | 31.00 |
| BF | 15.00 |

| Single lens data | | |
|---|---|---|
| Lens | Starting surface | Focal length |
| 1 | 1 | 53.70 |
| 2 | 4 | −9.04 |
| 3 | 5 | 11.63 |
| 4 | 7 | 16.78 |
| 5 | 9 | −40.94 |

Various values in each numerical example are summarized in the following

TABLE 1

| | First Numerical Example | Second Numerical Example | Third Numerical Example | Fourth Numerical Example | Fifth Numerical Example | Sixth Numerical Example | Seventh Numerical Example |
|---|---|---|---|---|---|---|---|
| f | 21.403 | 23.286 | 36.296 | 23.289 | 36.500 | 28.069 | |
| TL | 25.801 | 26.001 | 35.000 | 26.801 | 35.000 | 36.500 | 31.000 |
| ω | 45.367 | 42.770 | 39.392 | 42.776 | 39.308 | 37.588 | 41.686 |
| fp | 47.504 | 15.831 | 52.961 | 27.748 | 52.305 | 58.432 | 53.702 |
| fn | −13.691 | −7.920 | −11.497 | −8.180 | −10.376 | −10.407 | −9.040 |
| fnair | −4.309 | −11.352 | −8.003 | −8.129 | −8.222 | −7.159 | −6.006 |
| fRn | −24.506 | −17.468 | −44.599 | −41.662 | −46.113 | −59.415 | −40.941 |
| GpR1 | 7.738 | 11.834 | 14.659 | 7.005 | 12.769 | 14.396 | 10.406 |
| GpR2 | 9.062 | −25.826 | 18.784 | 9.014 | 16.333 | 18.559 | 12.421 |
| np1 | 1.881 | 1.900 | 1.954 | 2.001 | 2.001 | 2.001 | 2.001 |
| GRnR1 | −9.168 | −8.488 | −10.968 | −9.273 | −9.977 | −12.336 | −9.730 |
| GRnR2 | −31.991 | −20.683 | −21.394 | −14.975 | −17.748 | −21.128 | −18.575 |
| T | 23.889 | 24.917 | 31.290 | 22.974 | 32.762 | 32.924 | 28.561 |
| D | 3.575 | 2.817 | 7.546 | 2.620 | 7.661 | 7.491 | 5.568 |

TABLE 1-continued

| | First Numerical Example | Second Numerical Example | Third Numerical Example | Fourth Numerical Example | Fifth Numerical Example | Sixth Numerical Example | Seventh Numerical Example |
|---|---|---|---|---|---|---|---|
| (1)TL/(f × tanω) | 1.190 | 1.207 | 1.621 | 1.244 | 1.613 | 1.689 | 1.433 |
| (2) np12ave | 1.881 | 1.886 | 1.918 | 1.951 | 2.001 | 2.001 | 1.951 |
| (3) fGp/fGn | −3.470 | −1.999 | −4.606 | −3.392 | −5.041 | −5.615 | −5.940 |
| (4) fnair/fGn | −0.091 | −0.717 | −0.151 | −0.293 | −0.157 | 0.123 | −0.112 |
| (5) fnair/fGp | −0.201 | −0.488 | −0.304 | −0.349 | −0.310 | −0.255 | −0.247 |
| (6) fGRn/f | −1.145 | −0.750 | −1.696 | −1.789 | −1.740 | −2.117 | −1.686 |
| (7) (GpR2 + GpR1)/(GpR2 − GpR1) | 12.690 | 0.372 | 8.106 | 7.974 | 8.164 | 7.915 | 11.330 |
| (8) np1 | 1.881 | 19.004 | 1.954 | 2.001 | 2.001 | 2.001 | 2.001 |
| (9) (GRnR2 + GRnR1)/(GRnR2 − GRnR1) | 1.803 | 2.392 | 3.104 | 4.253 | 3.568 | 3.806 | 3.200 |
| (10) T/D | 6.683 | 8.846 | 4.147 | 8.769 | 4.277 | 4.395 | 5.129 |
| (11) f/fGp | 0.451 | 1.471 | 0.497 | 0.839 | 0.507 | 0.480 | 0.452 |
| (12) fGn/f | −0.640 | −0.340 | −0.437 | −0.351 | −0.392 | −0.371 | −0.372 |

[Imaging Apparatus]

Figure 15:
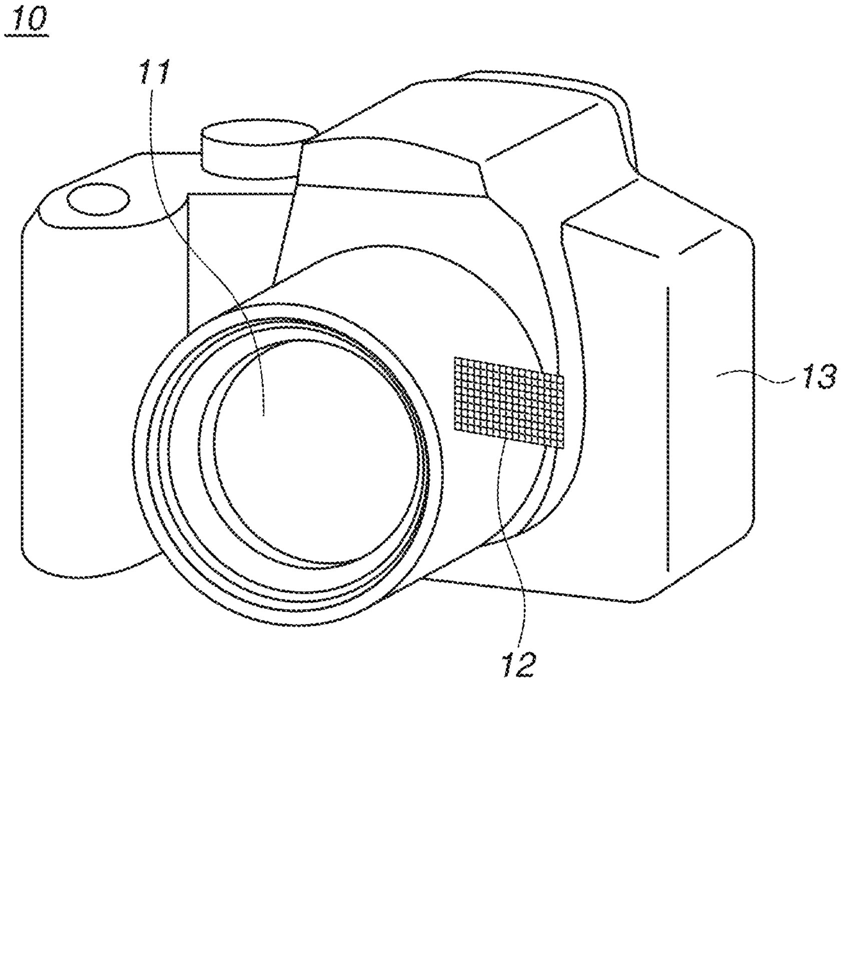
FIG. 15 is a schematic view of an imaging apparatus.

Subsequently, an exemplary embodiment of a digital still camera (imaging apparatus) using the optical system L0 according to the disclosure as an imaging optical system is described with reference to FIG. 15. FIG. 15 illustrates a camera main body 10, and an imaging optical system 11 constituted by the optical system L0 according to any one of the first to seventh exemplary embodiments. A solid-state image pickup element (photoelectric conversion element) 12, such as a charge-coupled device (CCD) sensor and a complementary metal-oxide semiconductor (CMOS) sensor, is built in the camera main body 10, receives light of an optical image formed by the imaging optical system 11, and photoelectrically converts the optical image. The camera main body 10 may be a single-lens reflex camera including a quick-return mirror, or a mirror-less camera not including the quick-return mirror.

In this manner, by applying the optical system L0 of the aspect of the embodiments to the imaging apparatus, such as the digital still camera, it is possible to obtain the imaging apparatus having a small lens.

While the description has been given of the exemplary embodiments and the numerical examples as above, the disclosure is not limited to the exemplary embodiments and the numerical examples and can be combined, modified, and changed in various manners within the scope of the disclosure.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-090270, filed May 31, 2023, which is hereby incorporated by reference herein in its entirety.

What is claimed is:

1. An optical system comprising:

six or less lenses, wherein the six or less lenses include a plurality of positive lenses, and a final lens having negative refractive power and disposed closest to an image, and wherein, where a total optical length obtained by addition of a back focus to a distance from a lens surface closest to an object in the optical system to a final lens surface is TL, a half angle of view is ω[°], a focal length of a whole system is f, an average value of a refractive index of a lens having a highest refractive index and a refractive index of a lens having a second highest refractive index among the plurality of positive lenses is np12ave, a curvature radius of a lens surface of the final lens on an object side of the final lens is GRnR1, and a curvature radius of a lens surface of the final lens on an image side of the final lens is GRnR2, following conditions are satisfied:

$$0.50 < TL/(f \times \tan\omega) < 1.90,\ 1.80 < np12ave < 2.20,$$

and $$1.00<(GRnR2+GRnR1)/(GRnR2-GRnR1)<8.00.$$

2. The optical system according to claim 1, wherein, where a focal length of an air lens having strongest negative refractive power, among air lenses formed of lenses constituting the optical system, is fair, a following condition is satisfied:

$$-1.00 < fnair/f < -0.05.$$

3. The optical system according to claim 1, wherein a positive lens element and a first negative lens are arranged in this order from an object side of the optical system, the positive lens element including a first positive lens, and wherein the positive lens element is a single lens or a cemented lens.

4. The optical system according to claim 3, wherein, where a focal length of the positive lens element is fGp and a focal length of the first negative lens is fGn, a following condition is satisfied:

$$-10.00 < fGp/fGn < -1.45.$$

5. The optical system according to claim 3, wherein, where a focal length of an air lens having strongest negative refractive power, among air lenses formed of lenses constituting the optical system, is fnair, and a focal length of the positive lens element is fGp, a following condition is satisfied:

$$-1.50 < fnair/fGp < -0.01.$$

6. The optical system according to claim 3, wherein, where a curvature radius of a lens surface of the positive lens element closest to the object is GpR1, and a curvature radius of a lens surface of the positive lens element closest to the image is GpR2, a following condition is satisfied:

$$-2.00<(GpR2+GpR1)/(GpR2-GpR1)<20.00.$$

7. The optical system according to claim 3, wherein a second positive lens is arranged on an image side of the first negative lens.

8. The optical system according to claim 7, wherein a third positive lens is arranged on an image side of the second positive lens.

9. The optical system according to claim 3, wherein, where a focal length of the positive lens element is fGp, a following condition is satisfied:

$$0.05<f/fGp<2.00.$$

10. The optical system according to claim 3, wherein, where a focal length of the first negative lens is fGn, a following condition is satisfied:

$$-1.00<fGn/f<-0.15.$$

11. The optical system according to claim 3, wherein a lens surface of the first negative lens on an object side of the first negative lens is a concave surface.

12. The optical system according to claim 3, wherein a positive lens A is arranged on an image side of the first negative lens, and wherein a lens surface of the positive lens A on an image side of the positive lens A is a convex surface.

13. The optical system according to claim 1, wherein, where a focal length of the final lens is fGRn, a following condition is satisfied:

$$-3.50<fGRn/f<-0.20.$$

14. The optical system according to claim 1, wherein, where the refractive index of the lens having the highest refractive index among the plurality of positive lenses is np1, a following condition is satisfied.

$$1.81<np1<2.20.$$

15. The optical system according to claim 1, wherein the optical system includes at least three positive lenses.

16. The optical system according to claim 1, wherein, where a diameter of an aperture stop at a maximum aperture is D, and a distance from the aperture stop to an image plane on an axis is T, a following condition is satisfied:

$$2.50<T/D<12.00.$$

17. An apparatus comprising:

the optical system according to claim 1; and an image pickup element configured to photoelectrically convert an image formed by the optical system.

18. The apparatus according to claim 17, wherein, in the optical system, where a focal length of an air lens having strongest negative refractive power, among air lenses formed of lenses constituting the optical system, is fnair, a following condition is satisfied:

$$-1.00<fnair/f<-0.05.$$

19. The apparatus according to claim 17, wherein, in the optical system, a positive lens element and a first negative lens are arranged in this order from an object side of the optical system, the positive lens element including a first positive lens, and wherein, in the optical system, the positive lens element is a single lens or a cemented lens.

20. An optical system comprising:

six or less lenses, wherein the six or less lenses include a plurality of positive lenses, and a final lens having negative refractive power and disposed closest to an image, wherein a positive lens element and a first negative lens are arranged in this order from an object side of the optical system, the positive lens element including a first positive lens, and wherein the positive lens element is a single lens or a cemented lens, and wherein, where a total optical length obtained by addition of a back focus to a distance from a lens surface closest to an object in the optical system to a final lens surface is TL, a half angle of view is ω[°], a focal length of a whole system is f, an average value of a refractive index of a lens having a highest refractive index and a refractive index of a lens having a second highest refractive index among the plurality of positive lenses is np12ave, a focal length of the positive lens element is fGp and a focal length of the first negative lens is fGn, following conditions are satisfied:

$$0.50<TL/(f\times\tan\omega)<1.90,\ 1.80<np12ave<2.20,$$

and $$-10.00<fGp/fGn<-1.45.$$

21. An optical system comprising:

six or less lenses, wherein the six or less lenses include a plurality of positive lenses, and a final lens having negative refractive power and disposed closest to an image, wherein a positive lens element and a first negative lens are arranged in this order from an object side of the optical system, the positive lens element including a first positive lens, and wherein the positive lens element is a single lens or a cemented lens, wherein a second positive lens is arranged on an image side of the first negative lens, wherein a third positive lens is arranged on an image side of the second positive lens, and wherein, where a total optical length obtained by addition of a back focus to a distance from a lens surface closest to an object in the optical system to a final lens surface is TL, a half angle of view is ω[°], a focal length of a whole system is f, and an average value of a refractive index of a lens having a highest refractive index and a refractive index of a lens having a second highest refractive index among the plurality of positive lenses is np12ave, following conditions are satisfied:

$$0.50 < TL/(f \times \tan\omega) < 1.90, \text{ and}$$

$$1.80 < np12ave < 2.20.$$

22. An optical system comprising:

six or less lenses, wherein the six or less lenses include a plurality of positive lenses, and a final lens having negative refractive power and disposed closest to an image, wherein a positive lens element and a first negative lens are arranged in this order from an object side of the optical system, the positive lens element including a first positive lens, and wherein the positive lens element is a single lens or a cemented lens, and wherein, where a total optical length obtained by addition of a back focus to a distance from a lens surface closest to an object in the optical system to a final lens surface is TL, a half angle of view is ω[°], a focal length of a whole system is f, an average value of a refractive index of a lens having a highest refractive index and a refractive index of a lens having a second highest refractive index among the plurality of positive lenses is np12ave, a focal length of the first negative lens is fGn, following conditions are satisfied:

$$0.50 < TL/(f \times \tan\omega) < 1.90, \; 1.80 < np12ave < 2.20,$$

and $$-1.00 < fGn/f < -0.15.$$

* * * * *